US011223478B2

(12) United States Patent
Eldefrawy et al.

(10) Patent No.: US 11,223,478 B2
(45) Date of Patent: Jan. 11, 2022

(54) BIOMETRIC AUTHENTICATION WITH TEMPLATE PRIVACY AND NON-INTERACTIVE RE-ENROLLMENT

(71) Applicant: SRI International, Menlo Park, CA (US)

(72) Inventors: Karim Eldefrawy, Palo Alto, CA (US); Ivan De Oliveira Nunes, Los Angeles, CA (US); Titouan Tanguy, Liège (BE)

(73) Assignee: SRI International, Menlo Park, CA (US)

( * ) Notice: Subject to any disclaimer, the term of this patent is extended or adjusted under 35 U.S.C. 154(b) by 328 days.

(21) Appl. No.: 16/373,355

(22) Filed: Apr. 2, 2019

(65) Prior Publication Data

US 2019/0312731 A1 Oct. 10, 2019

Related U.S. Application Data

(63) Continuation-in-part of application No. 15/945,559, filed on Apr. 4, 2018, now Pat. No. 10,719,594.

(51) Int. Cl.

*G06F 7/04* (2006.01)
*G06F 12/00* (2006.01)

(Continued)

(52) U.S. Cl.

CPC .......... *H04L 9/3231* (2013.01); *H04L 9/0861* (2013.01); *H04L 9/14* (2013.01)

(58) Field of Classification Search

CPC ....... H04L 9/3231; H04L 9/14; H04L 9/0861; H04L 9/085; H04L 9/0894; G06F 21/32

See application file for complete search history.

(56) References Cited

U.S. PATENT DOCUMENTS 5,991,408 A 11/1999 Person et al.
6,038,315 A 3/2000 Strait et al.

(Continued)

FOREIGN PATENT DOCUMENTS

JP 2006270697 A 10/2006
JP 2007148470 A 6/2007

(Continued)

OTHER PUBLICATIONS

Umut Uludag, Anil Jain, Securing Fingerprint Template: Fuzzy Vault with Helper Data, 2006 Conference on Computer Vision and Pattern Recognition Workshop (Year: 2006).*

(Continued)

*Primary Examiner* — Amie C. Lin

(74) *Attorney, Agent, or Firm* — Shumaker & Sieffert, P.A.

(57) ABSTRACT

An example system can include a reference biometric template (RBT) reader, an authenticator, and an auxiliary system. In some examples, during an initial enrollment process, the RBT reader obtains a biometric from a user, transforms the biometric into an RBT, and provides different shares of the RBT to the authenticator and the auxiliary system. The authenticator and the auxiliary system create respective shares of helper data. In some examples, the authenticator and the auxiliary system use a non-commutative transformation function to embed a secret key in their respective shares of the helper data. The auxiliary system provides its share of the helper data to the authenticator. The authenticator combines its share of the helper data with the share provided by the auxiliary system to create a full version of the helper data. The helper data can be used in a subsequent authentication process between the RBT reader and the authenticator.

22 Claims, 14 Drawing Sheets

(51) Int. Cl.

| | |
|---|---|
| ***G06F 12/14*** | (2006.01) |
| ***G06F 13/00*** | (2006.01) |
| ***G06F 17/30*** | (2006.01) |
| ***G11C 7/00*** | (2006.01) |
| ***H04L 9/32*** | (2006.01) |
| ***H04L 9/14*** | (2006.01) |
| ***H04L 9/08*** | (2006.01) |

(56) References Cited

U.S. PATENT DOCUMENTS

| | | | | |
|---|---|---|---|---|
| 7,769,210 | B2 | 8/2010 | Ito | |
| 9,407,435 | B2 * | 8/2016 | Li | H04L 9/0866 |
| 10,142,333 | B1 | 11/2018 | Griffin et al. | |
| 2007/0118758 | A1 | 5/2007 | Takahashi et al. | |
| 2007/0253608 | A1 | 11/2007 | Tulyakov et al. | |
| 2008/0019573 | A1 | 1/2008 | Baltatu et al. | |
| 2010/0027784 | A1 * | 2/2010 | Tuyls | H04L 63/061 380/44 |
| 2010/0066493 | A1 | 3/2010 | Rachlin | |
| 2010/0134246 | A1 * | 6/2010 | Kevenaar | G07C 9/257 340/5.82 |
| 2011/0191837 | A1 * | 8/2011 | Merchan | H04L 9/0866 726/6 |
| 2011/0264919 | A1 | 10/2011 | Pizano et al. | |
| 2012/0159600 | A1 | 6/2012 | Takagi | |
| 2013/0225128 | A1 | 8/2013 | Gomar | |
| 2015/0095654 | A1 | 4/2015 | Li et al. | |
| 2015/0278547 | A1 | 10/2015 | Kawamoto et al. | |
| 2015/0318994 | A1 * | 11/2015 | Walsh | H04L 9/3278 713/182 |
| 2016/0337326 | A1 | 11/2016 | O'Hare et al. | |
| 2018/0054436 | A1 | 2/2018 | Wagner | |
| 2019/0138753 | A1 | 5/2019 | Wallrabenstein | |
| 2019/0311096 | A1 | 10/2019 | Eldefrawy | |
| 2019/0312731 | A1 | 10/2019 | Eldefrawy et al. | |
| 2019/0327092 | A1 | 10/2019 | Kareti | |
| 2019/0370441 | A1 | 12/2019 | Eldefrawy et al. | |

FOREIGN PATENT DOCUMENTS

| | | | |
|---|---|---|---|
| JP | 2007272775 | A | 10/2007 |
| JP | 2008502070 | A | 1/2008 |
| JP | 2012044670 | A | 3/2012 |
| JP | 2015194959 | A | 11/2015 |
| KR | 20110065139 | A | 6/2011 |
| WO | 2005122059 | A1 | 12/2005 |

OTHER PUBLICATIONS

The Notification of Rejection, and translation thereof, from counterpart Japanese Application No. 2019-072053, dated Apr. 7, 2020, 4 pp.

Safi, "Indian court upholds legality of world's largest biometric database," The Guardian; Retrieved Apr. 30, 2020 from: https://www.theguardian.com/worl/2018/Sep/26/ indian-court-upholds-legality-of-worlds-largest-biometric-database, Sep. 26, 2018, 8 pp.

"Alleged breach of india's biometric database could put 1.2bn users at risk," CNN; Retrieved Apr. 30, 2020 from: https://www.cnn.com/2018/01/11/asia/ india-security-breach-biometric-database-intl/index.html, Dec. 3, 2018, 4 pp.

Nunes et al., "Secure non-interactive user reenrollment in biometrics-based identification and authentication systems," Springer, Proceedings of International Symposium on Cyber Security Cryptography and Machine Learning, Jun. 2018, 28 pp.

Ratha et al., "Enhancing security and privacy in biometrics-based authentication systems," IBM Systems Journal; vol. 40, No. 3, Jan. 2001, pp. 614-634.

Prabhakar et al., "Biometric recognition: Security and privacy concerns," IEEE security & privacy, No. 2, Mar./Apr. 2003, pp. 33-42.

"Scale and mamba: Secure computation algorithms from leuven and multiparty algorithms basic argot," Github, Retrieved Aug. 18, 2020 from: https://web.archive.org/web/20181226154808/https://github.com/KULeuven-COSI C/SCALE-MAM BA, Dec. 26, 2018, 2 pp.

Nandakumar et al., "Fingerprint-based fuzzy vault: Implementation and performance," IEEE Transactions on Information Forensics and Security, vol. 2, Dec. 2007, pp. 744-757.

Boyen et al., "Secure remote authentication using biometric data," in Proceedings of the 24th Annual International Conference on Theory and Applications of Cryptographic Techniques, Eurocrypt'05, May 22-26, 2005, pp. 147-163.

Fuller et al., "Computational fuzzy extractors," in Proceedings of 19th International Conference on the Theory and Application of Cryptology and Information Security, Asiacrypt 2013, Dec. 1-5, 2013, pp. 174-193.

Boyen, "Reusable cryptographic fuzzy extractors," in Proceedings of the 11th ACM Conference on Computer and Communications Security, CCS '04, Oct. 25-29, 2004, pp. 82-91.

Blanton et al., "On the (non-)reusability of fuzzy sketches and extractors and security in the computational setting," in Proceedings of the International Conference on Security and Cryptography, Secrypt-2011, Jul. 2011, pp. 68-77.

Blanton et al., "Analysis of reusability of secure sketches and fuzzy extractors," IEEE Transactions on Information Forensics and Security, vol. 8, Sep. 2013, 13 pp.

Apon et al., "Efficient, reusable fuzzy extractors from LWE," in Proceedings of Cyber Security Cryptography and Machine Learning—First International Conference, CSCML 2017, Jun. 29-30, 2017, 13 pp.

Goldreich et al., "How to play any mental game," in Proceedings of the Nineteenth Annual ACM Symposium on Theory of Computing, ACM, Jan. 1987, pp. 218-229.

Yao, "How to generate and exchange secrets," in Proceedings of the 27th Annual Symposium on Foundations of Computer Science, SFCS '86, Oct. 27-29, 1986, pp. 162-167.

Chaum et al., "Multiparty unconditionally secure protocols," in Proceedings of the Twentieth Annual ACM Symposium on Theory of Computing, STOC '88, Jan. 1988, pp. 11-19.

Beaver, "Foundations of Secure Interactive Computing," in Proceedings of the 11th Annual International Cryptology Conference on Advances in Cryptology, Crypto '91, Aug. 11-15, 1991, pp. 377-391.

Asharov et al., "Perfectly-Secure Multiplication for Any t < n/3," in Proceedings of 31st Annual Cryptology Conference on Advances in Cryptology, Crypto 2011, Aug. 14, 18, 2011, pp. 240-258.

Beerliova-Trubiniova et al., "Perfectly-Secure MPC with Linear Communication Complexity," in Proceedings of Fifth Theory of Cryptography Conference, TCC 2008, Mar. 19-21, 2008, 18 pp.

Canetti et al., "Adaptively secure multi-party computation," in Proceedings of the Twenty-eighth Annual ACM Symposium on Theory of Computing, STOC '96, Jul. 1996, pp. 639-648.

Canetti et al., "Universally composable twoparty and multi-party secure computation," in Proceedings of the Thirty-fourth Annual ACM Symposium on Theory of Computing, STOC '02, May 2002, pp. 494-503.

Damgard et al., "Multiparty computation from somewhat homomorphic encryption," in Proceedings of the 32nd Annual Cryptology Conference on Advances in Cryptology, Crypto 2012—vol. 7417, Aug. 19-23, 2012, pp. 643-662.

Damgard et al., "Practical Covertly Secure MPC for Dishonest Majority—Or: Breaking the SPDZ Limits," in Proceedings of 18th European Symposium on Research in Computer Security, ESORICS 2013, Sep. 9-13, 2013, 18 pp.

Archer et al., "Maturity and Performance of Programmable Secure Computation," IEEE Security & Privacy, vol. 14, No. 5, Oct. 27, 2016, 26 pp.

Yao, "Protocols for secure computations," in 23rd Annual Symposium on Foundations of Computer Science (SFCS 1982), IEEE, Nov. 3-5, 1982, 5 pp.

Rabin et al., "Verifiable secret sharing and multiparty protocols with honest majority," in Proceedings of the Twenty-First Annual ACM Symposium on Theory of Computing, ACM, Feb. 1989, pp. 73-85.

(56) References Cited

OTHER PUBLICATIONS

Beaver, "Efficient multiparty protocols using circuit randomization," in Proceedings of Annual International Cryptology Conference—Advances in Cryptology, Crypto '91, vol. 576, Aug. 11-15, 1991, pp. 420-432.
Cramer, "General secure multi-party computation from any linear secret-sharing scheme," in Proceedings of International Conference on the Theory and Applications of Cryptographic Techniques—Advances in Cryptology—Eurocrypt 2000, May 14-18, 2000, pp. 316-334.
Kiayias et al., "Cryptographic Hardness Based on the Decoding of Reed-Solomon Codes," in Proceedings of 29th International Colloquium, ICALP 2002, Jul. 8-13, 2002, 27 pp.
Ko et al., "User's Guide to NIST Biometric Image Software (NBIS)," NIST Interagency/Internal Report (NISTIR)-7392, Jan. 21, 2007, 207 pp.
Tams, "Absolute fingerprint pre-alignment in minutiae-based cryptosystems," in 2013 International Conference of the BIOSIG Special Interest Group (BIOSIG), Sep. 5-6, 2013, pp. 75-86.
Othman et al., "Osiris: An open source iris recognition software," Preprint submitted to Pattern Recognition Letters, Accepted Manuscript, Sep. 25, 2015, 11 pp.
"FVC 2000—Fingerprint Verification Competition," BioLab, Retrieved Aug. 18, 2020 from: https://web.archive.org/web/20190111205629/http://bias.csr.unibo.it/fvc2000/, Jan. 11, 2019, 1 pp.
"IIT Delhi Iris Database," Retrieved Aug. 18, 2020 from: https://web.archive.org/web/20190123145606/http://www4.comp.polyu.edu.hk/~csajaykr/IITD/Database_Iris.htm, Jan. 23, 2019, 9 pp.
Aumann et al.,"Security Against Covert Adversaries: Efficient Protocols for Realistic Adversaries," J. Cryptol., vol. 23, No. 2, Apr. 2010, pp. 281-343.
Huang et al., "Quid-Pro-Quo-tocols: Strengthening Semi-Honest Protocols with Dual Execution," in Proceedings of the 2012 IEEE Symposium on Security and Privacy, May 2012, pp. 272-284.
Hazay et al., "Efficient Protocols for Set Intersection and Pattern Matching with Security Against Malicious and Covert Adversaries," in Proceedings of the 5th Conference on Theory of Cryptography, TCC'08, Mar. 19-21, 2008, pp. 155-175.
Baron et al., "5PM: Secure Pattern Matching," in Proceedings of the 8th International Conference on Security and Cryptography for Networks, SCN 2012, Sep. 5-7, 2012, 51 pp.
Ohki et al., "Safety Countermeasures for Templates Using Fuzzy Biometric Valid Scheme," IPSJ SIG Technical Report, vol. 2005, No. 122, Dec. 9, 2005, 21 pp.
Satomura et al., "A Forgotten Secret Information Recovery Method and a Biometric Authentication Technique based on Fingerprints," IEICE Technical Report, The Institute of Electronics, Information and Communication Engineers, vol. 110, No. 443, Mar. 2011, 41 pp.
The Notification of Rejection, and translation thereof, from counterpart Japanese Application No. 2019-072260, dated Sep. 8, 2020, 7 pp.
Ohki et al., "Safety of Templates Using Fuzzy Biometric Valid Scheme," IPSJ SIG Technical Report, vol. 2005, No. 122, Dec. 9, 2005, 7 pp. (Translation provided for only the Abstract).
Satomura et al., "A Method of Fingerprint Authentication Using KSS(I)," IEICE Technical Report, The Institute of Electronics, Information and Communication Engineers, vol. 110, No. 443, Feb. 24, 2011, 12 pp. (Translation provided for only the Abstract).
Baron et al., "How to Withstand Mobile Virus Attacks, Revisited," Proceedings of the 2014 ACM symposium on Principles of distributed computing, Jul. 15-18, 2014, 34 pp.
Ben-Or et al., "Completeness Theorems for Non-Cryptographic Fault-Tolerant Distributed Computation," Jan. 1988, 10 pp.
Peterson, "OPM Says 5.6 Million Fingerprints Stolen in Cyberattack, Five Times as Many as Previously Thought," Washington Post, Sep. 23, 2015, 2 pp.
"IOM Access2000," retrieved from https://www.princetonidentity.com, Jul. 11, 2018, 3 pp.
Eldefrawy et al., "System and Methods for Secure Re-Enrollment of Biometric Templates in a (Cryptographically) Secure Biometrics-Based Identification, Authentication and Access-Control System (BIAA) Using Functional Encryption (FE)," Computer Science Laboratory, SRI international, Apr. 14, 2017, 8 pp.
"Lagrange Polynomial," Wikipedia, the free encyclopedia, retrieved from https://en.wikipedia.org/wiki/Lagrange_polynomial, Jun. 29, 2018, 8 pp.
"Shamir's Secret Sharing," Wikipedia, the free encyclopedia, retrieved from https://en.wikipedia.org/wiki/Lagrange_polynomial, Jun. 29, 2018, 7 pp.
Shamir, "How to Share a Secret," Communications of the ACM, vol. 22, No. 11, Nov. 1979, pp. 612-613.
Hersberg et al., "Proactive Secret Sharing Or: How to Cope with Perpetual Leakage," Advantages in Cryptology, Crypto '95, Jan. 1995, pp. 339-352.
Dolev et al., "Proactive Secret Sharing with a Dishonest Majority," Proceedings of the Security and Cryptography for Networks: 10th International Conference, Aug. 31-Sep. 2, 2016, 20 pp.
Maurer, "Secure Multi-Party Computation Made Simple," Discrete Applied Mathematics, vol. 154, No. 2, Feb. 1, 2006, pp. 370-381.
"Fuzzy Extractor," Wikipedia, the free encyclopedia, retrieved from https://en.wikipedia.org/wiki/Fuzzy_extractor, Jun. 29, 2018, 9 pp.
Dodis et al., "Fuzzy Extractors: How to Generate Strong Keys from Biometrics and Other Noisy Data," Advances in Cryptology—Eurocrypt 2004 Lecture Notes in Computer Science, vol. 3027, Jan. 20, 2008, 47 pp.
Juels et al., "A Fuzzy Vault Scheme," Proceedings IEEE International Symposium on Information Theory, Jun. 30-Jul. 5, 2002, 18 pp.
Goldreich., "General Cryptographic Protocols," Chapter 7, Foundations of Cryptography, vol. II Basic Applications, digitally printed version 2009, 449 pp. (Applicant points out, in accordance with MPEP 609.04(a), that the year of publication, 2009, is sufficiently earlier than the effective U.S. filing date, so that the particular month of publication is not in issue.).
Uludag et al., "Securing Fingerprint Template: Fuzzy Vault with Helper Data," IEEE 2006 Conference on Computer Vision and Pattern Recognition Workshop (CVPRW'06), Jun. 17-22, 2006, 8 pp.
Tulyakov et al., "Symmetric Hash Functions for Fingerprint Minutiae," Third International Conference on Advances n Pattern Recognition (ICAPR 2005), Aug. 22-25, 2005, 9 pp.
Notice of Allowance from U.S. Appl. No. 15/945,559, dated Feb. 24, 2020, 14 pp.

* cited by examiner

DEFINITION 1 (FV). *A Fuzzy Vault is defined as* FV $=$ $(\mathsf{FV}_{GEN}, \mathsf{FV}_{OPEN}, \Phi)$, *where* $\Phi$ *is a set of parameters* $\Phi = (d, GF(2^{\tau}), \mathsf{M}, \mathtt{dist}, \mathsf{w})$:

- $d$ *is the polynomial degree;*
- $GF(2^{\tau})$ *is a Galois Field of size* $2^{\tau}$;
- M *is a metric space;*
- dist *is distance function define over* $M$;
- w *is distance threshold;*

$\mathsf{FV}_{GEN}$ *and* $\mathsf{FV}_{OPEN}$ *are algorithms defined as follows:*

- $\mathsf{FV}_{GEN}$:
  - *Inputs:* $k$ *and* $\mathsf{RBT}_U$, *s.t.*, $|k| = (d+1) \times \tau$.
  - *Output:* HD
- $\mathsf{FV}_{OPEN}$:
  - *Inputs:* HD *and* $\mathsf{RBT}'_U$
  - *Output:* $k$ *or* $\perp$ DEFINITION 2 (FV-COMPLETENESS). $\mathsf{FV} = (\mathsf{FV}_{GEN}, \mathsf{FV}_{OPEN}, \Phi)$ *is complete with* $w$*-fuzziness if for every possible* $k \in GF(2^{\tau})^{d+1}$ *and every pair* RBT, RBT′ *with* $\mathtt{dist}(\mathsf{RBT}, \mathsf{RBT}') \leq w$:

$$\mathsf{FV}_{OPEN}(\mathsf{FV}_{GEN}(k, \mathsf{RBT})) = k \quad (5)$$

*with overwhelming probability.*

DEFINITION 3 (FV-SECURITY). $\mathsf{FV} = (\mathsf{FV}_{GEN}, \mathsf{FV}_{OPEN}, \Phi)$ *is* $p$*-information theoretically secure if any computationally unbounded adversary with access to* $HD$ *is able to guess* RBT *with success probability of at most* $p$.

FIG. 12

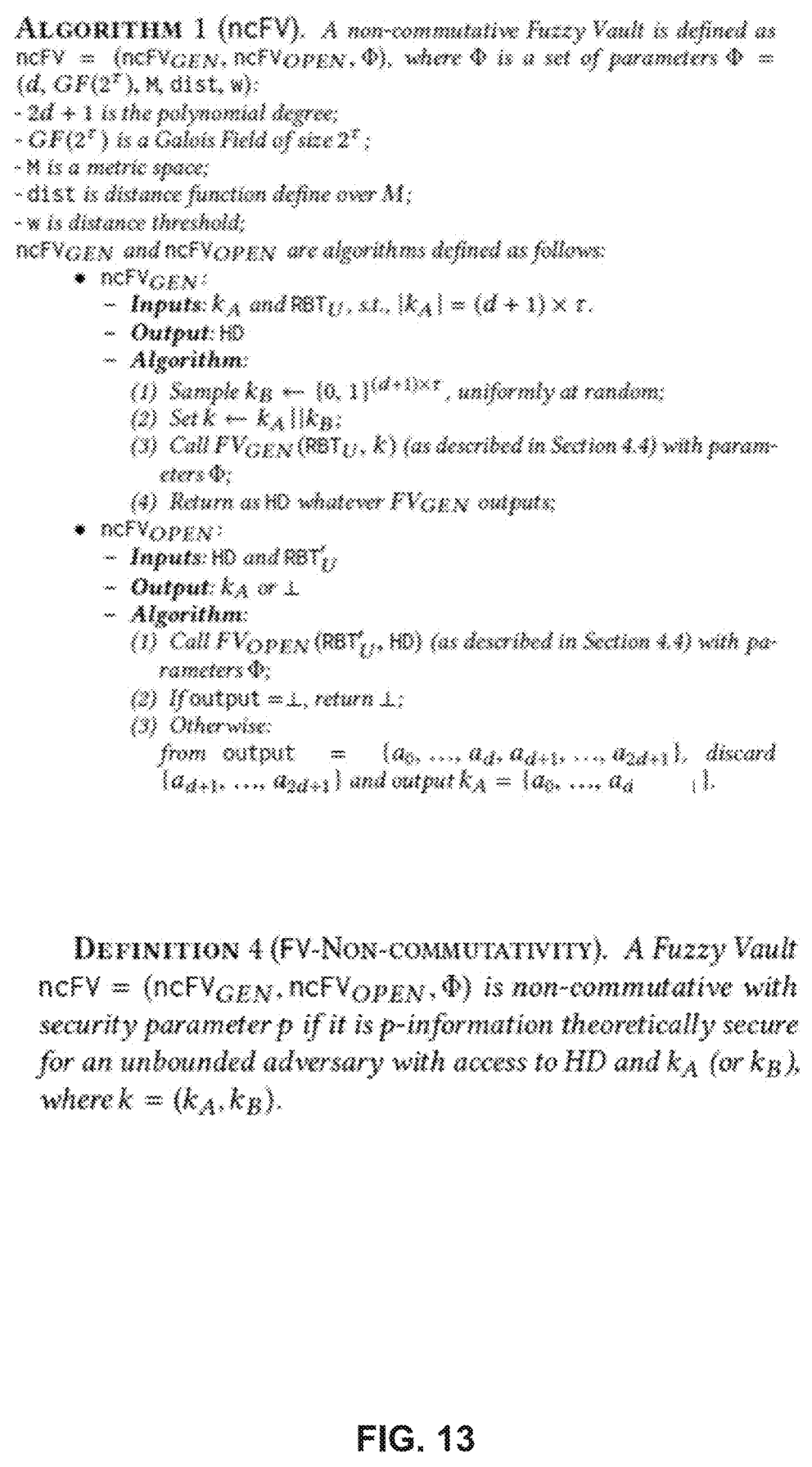

ALGORITHM 1 (ncFV). *A non-commutative Fuzzy Vault is defined as* ncFV = (ncFV$_{GEN}$, ncFV$_{OPEN}$, $\Phi$), *where* $\Phi$ *is a set of parameters* $\Phi = (d, GF(2^{\tau}), \mathtt{M}, \mathtt{dist}, \mathtt{w})$:

- $2d+1$ *is the polynomial degree;*
- $GF(2^{\tau})$ *is a Galois Field of size* $2^{\tau}$;
- M *is a metric space;*
- dist *is distance function define over* $M$;
- w *is distance threshold;* ncFV$_{GEN}$ *and* ncFV$_{OPEN}$ *are algorithms defined as follows:*

- ncFV$_{GEN}$:
  - *Inputs*: $k_A$ *and* RBT$_U$, *s.t.*, $|k_A| = (d+1) \times \tau$.
  - *Output*: HD
  - *Algorithm*:
    1. *Sample* $k_B \leftarrow \{0,1\}^{(d+1)\times\tau}$, *uniformly at random;*
    2. *Set* $k \leftarrow k_A || k_B$;
    3. *Call* $FV_{GEN}$(RBT$_U$, $k$) *(as described in Section 4.4) with parameters* $\Phi$;
    4. *Return as* HD *whatever* $FV_{GEN}$ *outputs;*
- ncFV$_{OPEN}$:
  - *Inputs*: HD *and* RBT$'_U$
  - *Output*: $k_A$ *or* $\perp$
  - *Algorithm*:
    1. *Call* $FV_{OPEN}$(RBT$'_U$, HD) *(as described in Section 4.4) with parameters* $\Phi$;
    2. *If* output $= \perp$, *return* $\perp$;
    3. *Otherwise:* *from* output $= \{a_0, \ldots, a_d, a_{d+1}, \ldots, a_{2d+1}\}$, *discard* $\{a_{d+1}, \ldots, a_{2d+1}\}$ *and output* $k_A = \{a_0, \ldots, a_d\}$.

DEFINITION 4 (FV-NON-COMMUTATIVITY). *A Fuzzy Vault* ncFV = (ncFV$_{GEN}$, ncFV$_{OPEN}$, $\Phi$) *is non-commutative with security parameter p if it is p-information theoretically secure for an unbounded adversary with access to HD and* $k_A$ *(or* $k_B$*), where* $k = (k_A, k_B)$.

FIG. 13

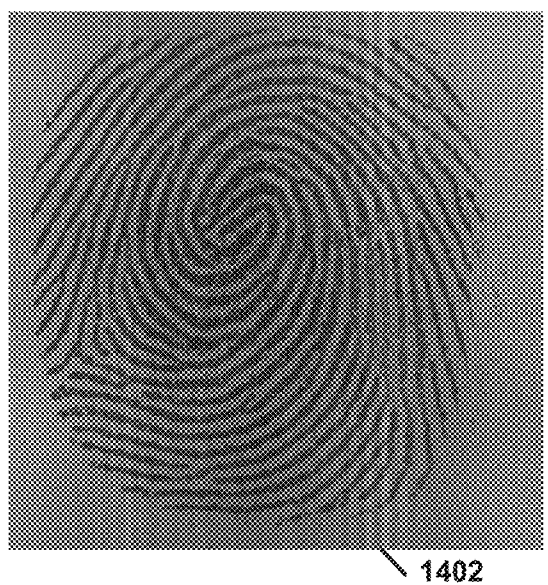
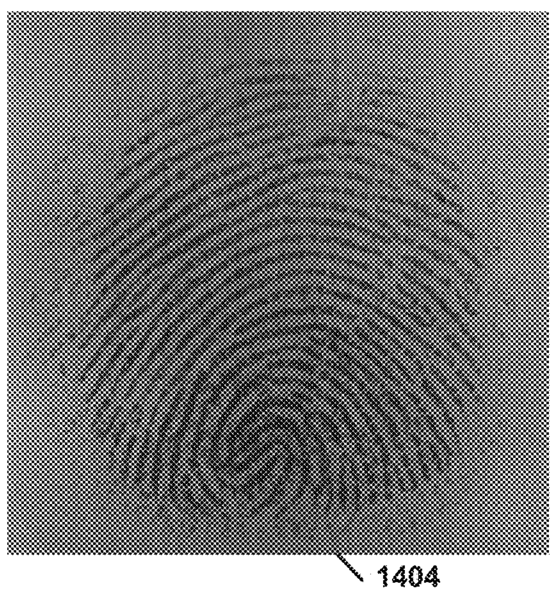
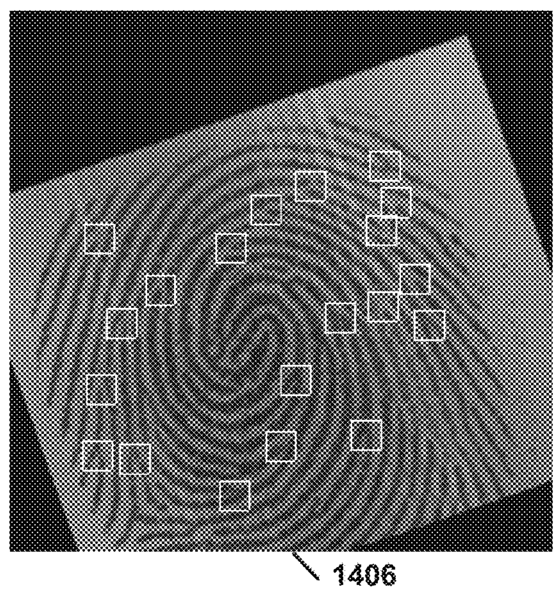
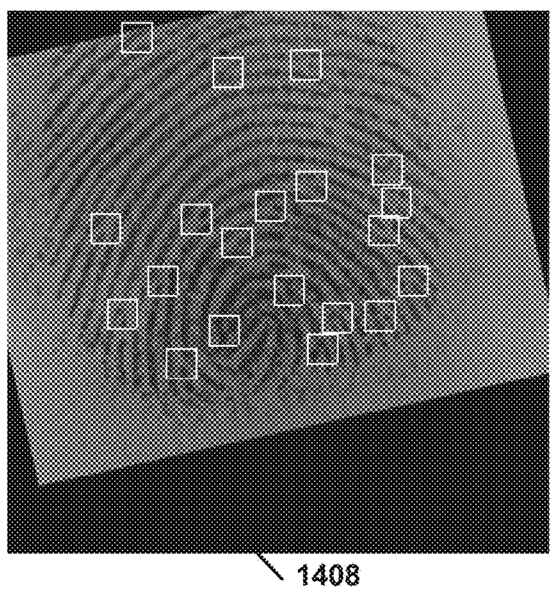
FIG. 14

BIOMETRIC AUTHENTICATION WITH TEMPLATE PRIVACY AND NON-INTERACTIVE RE-ENROLLMENT

This application is a continuation-in-part of, and claims the priority benefit of, U.S. patent application Ser. No. 15/945,559, filed Apr. 4, 2018, the entire contents of which is incorporated herein by reference.

TECHNICAL FIELD

The disclosure relates to biometrics-based authentication providing template privacy and non-interactive re-enrollment.

BACKGROUND

Authentication systems, e.g., Biometrics-based Identification, Authentication and Access control (BIAA) systems, process and analyze biometric information of a user to determine whether to provide the user with secure access and privileges to physical or virtual environments. During a user's initial use of these authentication systems, the authentication systems typically "enroll" (i.e., process and store) the user's biometric information. For example, authentication systems may process and store a template of the user's biometric sample (referred to as a "biometric template" or "Reference Biometric Template" (RBT)) that is a reference of the user's biometric information. The stored RBT is used to compare with a user's subsequent biometric sample to authenticate the user. However, in the case of a security breach, the RBT may be compromised and used to circumvent the authentication systems.

Some conventional authentication systems use cryptographic algorithms to generate so-called 'helper data,' which generally refers to information used to authenticate the user. In these conventional authentication systems, helper data is typically computed from the user's biometric information and is stored in place of RBTs to ensure that no information of the original biometric information is stored in the authentication system. In the event of a security breach or update, these conventional authentication systems need to collect additional or repeat biometric information of users to generate new helper data because the original biometric information is not stored. However, in installations or security domains with a large number of users, the collection of original or new biometrics for the users is a manual process that is cumbersome, or even impractical, process.

Additionally, large scale BIA systems typically store RBTs of thousands (or even millions) of users in clear form. One of the reasons for this is that standard mechanisms for secure password storage (e.g., salted hashing) cannot match the two readings of the same biometric, because two samples of the same biometric are slightly different from each other due to sampling noise. In addition, stable biometrics (e.g. fingerprints and iris) tend not to change over an individual's lifetime. Therefore, leakage of a user's biometric at any point in time can affect the security of all authentication systems using the leaked biometric. Consequently, protecting the confidentiality of RBTs can be of utmost importance.

SUMMARY

In general, this disclosure describes techniques for secure Biometric-based Identification and Authentication (BIA) that facilitate template privacy and enable non-interactive re-enrollment. Frequently executed operations using the described techniques may involve only two parties, unlike previous systems which typically involve at least three parties to satisfy both requirements. A BIA system can include a Reference Biometric Template (RBT) reader, an authenticator, and an auxiliary system. In some examples, during an initial enrollment process, the RBT reader obtains a biometric from a user, transforms the biometric into an RBT, and provides different shares of the RBT to the authenticator and the auxiliary system. The authenticator and the auxiliary system persistently store their respective shares of the RBT for later use should re-enrollment be desired. The authenticator and the auxiliary system create respective shares of helper data. In one or more aspects, the authenticator and the auxiliary system use a non-commutative transformation function to embed a secret key in their respective shares of the helper data. The auxiliary system provides its share of the helper data to the authenticator. The authenticator then combines its share of the helper data with the share provided by the auxiliary system to create a full version of the helper data. This initial enrollment process may be the only time that all three parties of the BIA system are involved.

In some examples, as part of an authentication process, the RBT reader obtains a biometric from a user, and generates a different reference biometric template, RBT', from the biometric. The RBT reader obtains the helper data from the authenticator and uses the helper data and the RBT' to attempt to extract the secret key from the helper data. The authenticator can then determine authenticity of the user by determining whether the RBT reader was able to successfully extract the correct secret key from the helper data using RBT'.

In some examples, as part of a re-enrollment process, the authenticator and the auxiliary system generate respective new shares of helper data by generating a new secret key and embedding the new secret key into their shares of the helper data using their respective saved shares of the RBT obtained during the initial enrollment process. The auxiliary system provides its share of the new helper data to the authenticator. The authenticator then combines its share of the new helper data with the share provided by the auxiliary system to create a full version of the new helper data.

The authenticator and the auxiliary system can use a non-commutative transformation to embed a secret key into their respective shares of the helper data. In one or more aspects, a non-commutative Fuzzy Vault (ncFV) provides the non-commutative transformation. The non-commutative Fuzzy Vault can be realized in a distributed secure way using an oblivious shuffling functionality implemented using secure two-party computation (2PC), for instance.

In one example aspect, a method includes receiving, by an authenticator of a biometric authentication system, a first share of an RBT from a biometric sensor; creating, by the authenticator, a first secret key comprising a first share of the first secret key and a second share of the first secret key; receiving, by the authenticator, a first share of a second secret key; determining, by the authenticator, a first polynomial from the first share of the first secret key and the first share of the second secret key; generating, by the authenticator, a first share of first helper data based, at least in part, on the first polynomial and the first share of the reference biometric template; receiving, by the authenticator, a second share of the first helper data; creating, by the authenticator, the first helper data from the first share of the first helper data and the second share of the first helper data; and storing, by the authenticator, the first secret key and the first helper data in a storage device for use in authenticating a user associated with the reference biometric template; wherein the reference biometric template cannot be recovered using clear forms of the first secret key and the first helper data.

In another example aspect, a method includes receiving, by a computing system, a first secret key share and a first data set; generating, by the computing system uniformly at random, a second secret key share; creating, by the computing system, a secret key based on the first secret key share and the second secret key share; and generating, by a fuzzy vault (FV) generate function of the computing system, helper data based, at least in part, on the secret key and the first data set, the helper data for use in authenticating a user associated with the first data set.

In a further example aspect, a biometric authentication system comprises an auxiliary service configured to: receive a first share of a reference biometric template from a biometric sensor; create a first secret key comprising a first share of the first secret key and a second share of the first secret key; receive a first share of a second secret key; determine a first polynomial from the first share of the first secret key and the first share of the second secret key; and generate a first share of first helper data based, at least in part, on the first polynomial and the first share of the reference biometric template, wherein the first helper data is for use in authenticating a user associated with the reference biometric template.

In a still further example aspect, a biometric authentication system comprises a first RBT reader comprising a first biometric sensor, the first RBT reader configured to: create an authentication reference biometric template from a first biometric sample obtained via the first biometric sensor; receive helper data from the authenticator, the helper data comprising a first share determined by the authenticator and a second share determined by the auxiliary system; and determine a secret key based, at least in part, on the authentication reference biometric template and the helper data, wherein the secret key is determined according to a strict subset of coefficients of a polynomial encoded into the helper data; wherein the authenticator is further configured to determine that the first RBT reader has correctly determined the secret key.

The techniques may provide one or more advantages. For example, a technical problem with conventional FV implementations is that they can be commutative. Thus, in conventional FV construction, not only can a secret key be obtained from helper data by providing the appropriate RBT, but also the reverse is true: by having the secret key and the helper data, the RBT can be derived. This property is referred to as input commutativity. This is a technical problem in systems in which storing both the helper data and secret key is desirable, because it can allow recovering the RBT of a user, which may allow parties to subsequently impersonate the user. As a technical solution to this problem, one or more aspects utilize a modified implementation of the FV algorithm, referred to as non-commutative FV (ncFV). The implementation of ncFV does not suffer from input commutativity and thus this technical improvement over conventional FV implementations may provide one or more practical applications, such as reducing a number of parties required for secure authentication, facilitating biometric privacy, enabling multiple authentication entry points, providing for ease of use and non-interactive re-enrollment, and/or being biometric agnostic.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF THE DRAWINGS

FIG. 12 provides definitions related to a Fuzzy Vault, in accordance with one or more aspects described in this disclosure.

FIG. 13 provides definitions related to a non-commutative Fuzzy Vault, in accordance with one or more aspects described in this disclosure.

FIG. 14 provides example fingerprints and example minutiae determined from the fingerprints.

DETAILED DESCRIPTION

In typical BIA systems there are two main stakeholders to be considered, the user and the enterprise implementing the BIA system. The user is required to provide its biometric to enroll and authenticate in BIA systems. From a user's perspective, it is important that the biometric remains confidential, given that once the biometric is compromised it can be used to impersonate the user. Further, biometric revocation can be challenging and in some cases may be impossible, as the biometric is a part of who the user is. The usability of the biometric system can also a concern. For successful adoption, it is desirable that the security mechanisms used in the BIA introduce a minimal burden to the user, especially with operations that must be repeated regularly (such as authentication).

The enterprise may deploy the BIA system in order to verify user's claimed identity. The BIA system may be used to enforce access control to physical or digital areas/goods. The enterprise would normally want to be in charge of the cryptographic secrets (e.g. symmetric/asymmetric keys) generation and policies (e.g., expiration dates, usage, and replacement). However, an honest enterprise typically has no interest in storing the user's biometrics in clear form. The potential leakage of such personal and private data can represent a liability to the enterprise.

Figure 1:
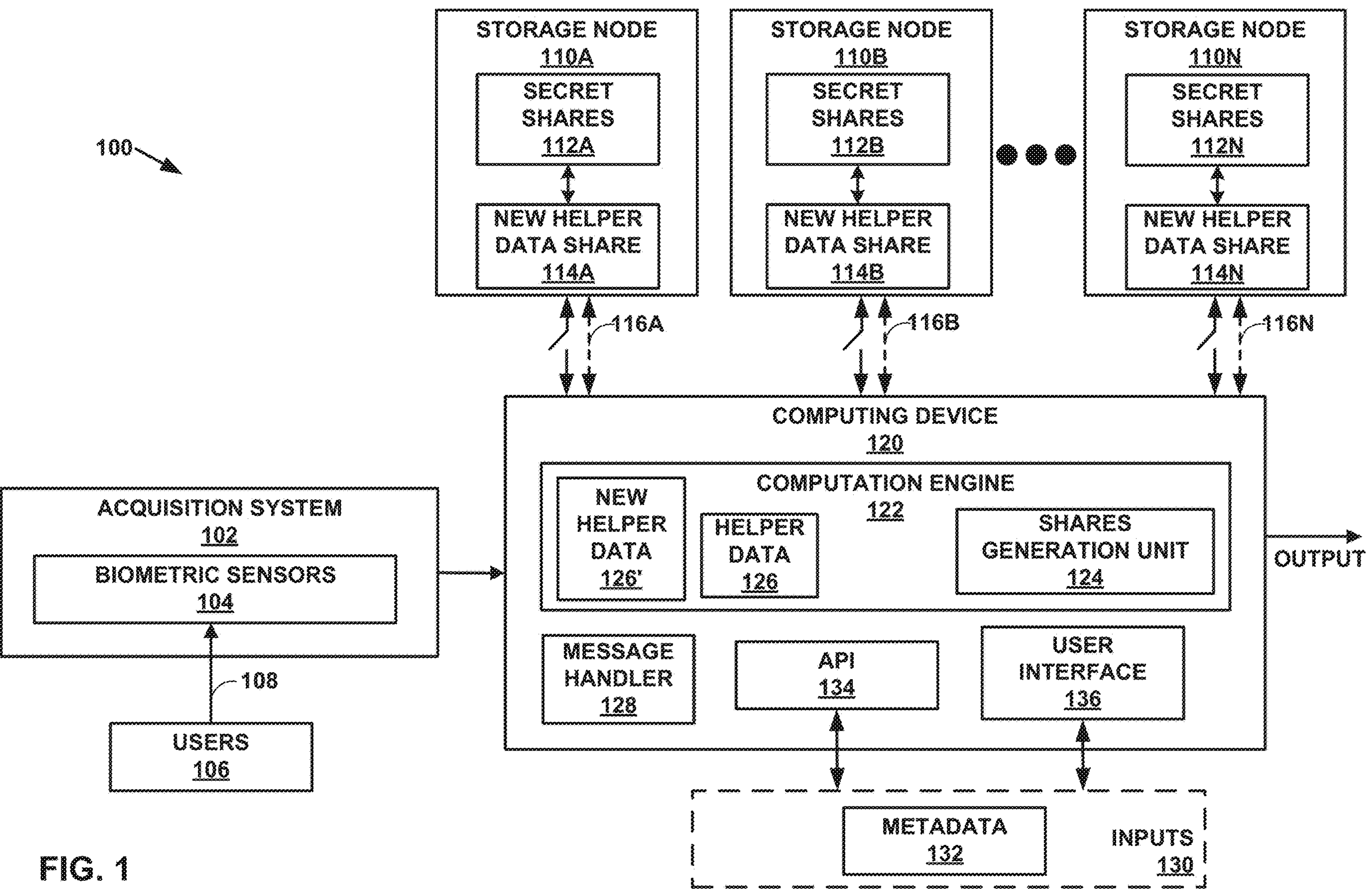
FIG. 1 illustrates an example biometric authentication system, in accordance with one or more aspects described in this disclosure.

FIG. 1 illustrates an example biometric authentication system 100, in accordance with one or more aspects described in this disclosure. In this example configuration, biometric authentication system 100 comprises at least an acquisition system 102, a computation engine 122 executing on an execution environment provided by computing devices 120, and a plurality of storage nodes 110A-110N (collectively, "storage nodes 110").

Acquisition system 102 accepts input from one or more biometric sensors 104 to acquire biometric information for one or more users. For instance, acquisition system 102 may comprise one or more biometric sensors 104 that include, fingerprint scanners (capacitive or optical), palm scanners, facial recognition scanners, facial expression scanners, iris/retina scanners, infrared cameras, heart rate scanners, gait sensors (e.g., video or accelerometers), or other biometric sensors that read biometric information 108 from users 106. Biometric information may include a biometric sample that comprises an image of a fingerprint, an image of a palm print, an image of a face, an image of a retinal scan, an image of an iris, heart rate patterns, movement of limbs, binary code in the case of an iris or audio sample, or the like, or a combination of two or more of such elements. In some examples, the components of acquisition system 102, including biometric sensors 104, are included within one physical structure. In some examples, the biometric sensors 104 are in different physical structures.

In some examples, biometric sensors 104 may read biometric samples from users 106 seeking access and/or privileges to physical and/or virtual environments, e.g., a software application, a physical lock, or other type of secure storage or application. Acquisition system 102 may receive biometric samples (e.g., images of fingerprints) from biometric sensors 104 and send the biometric samples to computation engine 122 for processing and storage, as further described below.

Computation engine 122 may be implemented in circuitry on one or more physical computing devices 120. For example, computation engine 122 may be implemented using a cluster of one or more server devices, server blades, personal computers, mobile computing devices, and/or other types of computing devices. For clarity, computing devices 120 are omitted from the remaining figures. However, it should be understood that in the context of other figures, computation engines are implemented in circuitry on one or more physical computing devices. In some examples, acquisition system 102 has screens or monitors that computation engine 122 can use to control and/or configure the operations of computation engine 122.

Computation engine 122 may include an application programming interface 134 and user interface 136 to receive inputs 130 from an operator, such as metadata 132. Metadata 132 may comprise data about objects, machines, people, or other information acquired by acquisition system 102. User interface 136 may comprise a graphical user interface, a command line interface, or another type of user interface that receives indications of user input from a user. API 134 may comprise an interface through which a software application can interact with computation engine 122. For instance, a software application may use API 134 to enable computation engine 122 to get data.

Storage nodes 110 may represent local or remote storage units for storing computer-readable data. For example, storage nodes 110 may represent any or all of hard drives, flash drives, Universal Storage Bus (USB) devices, tape drives, hard drives, floppy disks, compact disks, removable storage devices, etc. that are physically coupled to computing device 109, as well as storage devices that are physically coupled to remote computing devices, such as server devices. Storage nodes 110 may each be implemented using one or more computing devices, such as Network Attached Storage (NAS) devices, Storage Area Network (SAN) devices, server devices, or other types of computing devices. Storage nodes 110 may store various types of data. For example, storage nodes 110 may store secret shares 112 of the biometric information and new helper data shares 114 (as described further below), inputs 130, outputs of computation engine 122, reference data, and other types of data.

In some examples, storage nodes 110 may comprise online and offline storage devices. For example, one or more storage nodes 110 may be configured as temporarily accessible and are accessible only on a needed basis (e.g., during re-enrollment). In some examples, one or more storage nodes 110 may be physically removed from the one or more physical computing devices 120 and connected only on a needed basis (e.g., during re-enrollment). In some examples, storage nodes 110 may comprise geographically dispersed storage devices. Computation engine 122 may include a storage interface implemented in circuitry that is configured to interface with storage nodes 110.

During a user's initial use of biometric authentication system 100, biometric authentication system 100 "enrolls" biometric information of the users for subsequent authentication of the users. That is, biometric authentication system 100 collects and processes the biometric information to generate helper data 126 for each user subsequent authentication of the respective user. For example, computation engine 122 may initially process biometric samples received from acquisition system 102 and determine indicia of biometric information from the biometric samples. Indicia of biometric information may include minutiae points of a fingerprint, iris codes in the case of eye scans, or other points of granularity of a biometric sample. Computation engine 122 may compute a template (referred to herein as a "biometric template," "Reference Biometric Template" or "RBT") according to the indicia of biometric information. The RBT is a template that provides a reference of the points of granularity extracted from a biometric sample. For example, an RBT for a fingerprint scan may identify the coordinates and orientation of specific points (e.g., ridge endings, ridge bifurcations, short ridges, etc.) of a fingerprint. Computation engine 122 may receive an image of a fingerprint and divide the image into blocks. Each block includes a part of the image of the fingerprint. Computation engine 122 determines the coordinates of indicia of the fingerprint within each block (in relation to other blocks) and an orientation of the indicia of the fingerprint (e.g., the direction of an underlying ridge or bifurcation).

In this example of FIG. 1, as noted above, centralized computing device 120 of biometric authentication system 100 generates respective helper data 126 for each user for subsequent authentication of the user. As one example, helper data 126 may comprise a random string that is information about the RBT that could be made public but does not reveal any significant information of the RBT. Biometric authentication system 100 utilizes helper data 126 for authentication of that user. For example, biometric authentication system 100 may use helper data with a subsequent biometric sample (e.g., a noisy version of the biometric sample) to reconstruct a digital key or identifier that provides access or privileges for the authenticated user.

In some examples, biometric authentication system 100 uses one or more cryptographic algorithms, including, but not limited to, a fuzzy extractor scheme or a fuzzy vault scheme, to generate helper data 126. As one example, a fuzzy extractor scheme comprises two functions: a "Generate" function and a "Regenerate" function. The Generate function is executed to generate a digital key (Key) and one or more public parameters (Pub), where w represents an input of a string of data from a biometric sample converted to an RBT or another suitable form, as shown below:

$$\text{Generate}(w)=(\text{Key},\text{Pub}) \quad \text{Function 1}$$

In general, helper data 126 is obtained by binding or locking a digital key (e.g., a random cryptographic key) with the RBT. Following the generation of helper data, the helper data is stored in a readily-accessible storage area for subsequent authentication of users 106 (illustrated as "helper data 126" in FIG. 1), and the RBT is typically discarded to avoid storing biometric information in the online portion of the biometric authentication system. Although helper data 126 is illustrated as stored in a readily-accessible storage within computing device 120, helper data 126 may be stored in a readily-accessible storage external to computing device 120.

After generation of helper data 126, biometric authentication system 100 uses subsequent biometric samples to authenticate users 106. For example, biometric authentication system 100 uses helper data 126 generated during initial enrollment together with the subsequent biometric samples to reconstruct the digital key that provides access or privileges for the authenticated user. As one example, a Regenerate function is used to reconstruct digital key (Key') that is used for authenticating the user, where w' represents an input of a string of data from a subsequent biometric sample converted to an RBT or another suitable form and Pub is the public parameters generated during initial enrollment, as shown below:

$$\text{Key}'=\text{Regenerate}(\text{Pub},w') \quad \text{Function 2}$$

In some example, Key' is generated if the difference between the initial biometric sample and the subsequent biometric sample is within the defined threshold (d), which is a tunable parameter that defines an acceptable detection accuracy, as shown below:

$$\text{Key}'=\text{Key if } |w-w'<d \quad \text{Function 3}$$

The value of the threshold may be chosen to improve or maximize the detection accuracy. In some examples, the threshold may be defined to maximize Genuine Accept Rate (GAR) and to minimize False Accept Rate (FAR). As one example, the user may subsequently provide a noisy version of a biometric sample in which the difference between the initial biometric sample and the subsequent noisy version of the biometric sample is not within an acceptable detection accuracy threshold. As a result, Key' is not generated. If the difference between the initial biometric sample and the subsequent noisy version of the biometric sample is within an acceptable detection accuracy threshold, Key' is generated and the user is authenticated.

In the event of an update or security breach of biometric authentication system 100, helper data 126 generated during initial enrollment may be compromised. To generate new helper data, conventional authentication systems typically need to store and reuse the original biometric information, which puts the original biometric information at risk, or would need previously enrolled users (or compromised users) to provide additional or repeat biometric information. However, in large-scale systems, the re-enrollment process may require a large number of users to each manually provide additional or repeat biometric information, which is an inefficient and sometimes an impractical process.

In accordance with the techniques of this disclosure, computing device 120 coordinates biometric re-enrollment using secure distributed secret sharing within authentication system 100. As described herein, the techniques enable re-enrollment and computation of new helper data 126' for user authentication without having to recover or otherwise reuse the original biometric information at computing device 120 and without having to re-acquire additional or repeat biometric information. For example, during initial enrollment, computation engine 122 of computing device 120 collects and processes biometric information of the user and generates initial helper data 126 for user authentication. After constructing helper data 126, and prior to discarding the biometric information (e.g., RBT), computation engine 122 initiates a distributed secret sharing process with a plurality of secure storage nodes 110 (e.g., storage servers distributed within one or more network domains) to generate and store, in a secure and distributed manner, a plurality of secret shares 112A-112N (collectively, "secret shares 112" or "secret share values 112") according to a representation of (e.g., a multi-polynomial representation of) the biometric information.

For example, during enrollment, shares generation unit 124 coordinates secure computation of secret shares 112 using a shared secret scheme in which a multi-polynomial representation of the biometric information is used as the shared secret. Initially, shares generation unit 124 processes the biometric information to determine a representation of the biometric to be used as the shared secret in the secure computation of the helper data. For example, an RBT for a fingerprint may include a set of minutiae points in which each minutiae point comprises coordinates (e.g., $X_n$ and $Y_n$) and an orientation (e.g., $\theta_n$) of ridge endings, ridge bifurcations, short ridges, etc., of an image of a fingerprint. That is, each minutiae point is defined by an X-coordinate of a specific point in the image of a fingerprint, a Y-coordinate of the specific point in the image of the fingerprint, and the orientation of the specific point in the image of the fingerprint. In this example, shares generation unit 124 may encode (otherwise referred to as 'secret sharing') coordinates and orientations, e.g., $(X_1, Y_1, \theta_1)$, $(X_2, Y_2, \theta O_2)$, . . . $(X_n, Y_n, \theta_n)$, for each respective minutia point. In determining the shared secret to be used, shares generation unit 124 may convert each of the coordinates and orientations of the RBT to an integer value that is stored as the free term (p(0)) of a respective polynomial, e.g., $p_1(0)=X_1$, $p_2(0)=Y_1$, and $p_3(0)=\theta_1$ (or in some examples, shares generation unit 124 converts the coordinates and orientation to a single integer value). In this example, three polynomials (i.e., $p_1(x)$, $p_2(x)$, and $p_3(x)$) are used to share a single minutia point (e.g., $(X_1, Y_1, \theta_1)$). In other words, polynomial $p_1(x)$ is used to encode an X-coordinate of a single minutiae point, $p_2(x)$ is used to encode a Y-coordinate of the single minutiae point, and $p_3(x)$ is used to encode the orientation of the single minutiae point.

As further described below, shares generation unit 124 may then evaluate each polynomial at a minimum of "n" points, where "n" is the number of shares needed to determine the free term of the polynomial. Continuing the example above, assume a respective parabola is used to encode corresponding portions of the biometric information (e.g., the X-coordinate, the Y-coordinate, and orientation). Shares generation unit 124 may generate at the shared secret by evaluating the parabola at three points, e.g., $p_1(1)$, $p_1(2)$, and $p_1(3)$, that represent evaluated points at X=1, X=2, and X=3, respectively, of the parabola. In this example, a minimum of three shares is generated such that at least three shares are needed to determine the encoded portion of the biometric, e.g., the value that is stored as the free term of a respective polynomial, e.g., $p_1(0)=X_1$. Without knowledge of at least three shares, the portion of the biometric information encoded in the free term of the polynomial remains unknown. Although three shares for each of the three polynomials are used in this example, any number of polynomials and/or number of shares may be used to encode indicia of biometric information. Although described with respect with Shamir's secret-sharing scheme, shares generation unit 124 may implement any secret-sharing technique that can be extended to enable computation on secret shared data via the techniques described herein or other secure computation techniques. Additional example information with respect to secure computation protocols is described in Baron, Joshua, et. al., "How to withstand mobile virus attacks, revisited," dated July 2014; Ben-Or, Michael, et. al., "Completeness theorems for non-cryptographic fault-tolerant distributed computation," dated May 1988; and Goldreich, Oded, "Foundations of Cryptography: Volume 2, Basic Applications," dated 2004, the entire contents of each of which are incorporated by reference herein.

After computing the secret shares from the RBT, computing device 120 communicates each of the plurality of secret shares to a corresponding one of storage nodes 110 such that the corresponding storage nodes 110 each store secret shares of respective polynomials. Continuing the example of above, computing device 120 may use a storage interface (not shown) that is implemented in circuitry to interface with storage nodes 110 to store secret shares of polynomials that encode the X-coordinate, the Y-coordinate, and orientation of a respective minutiae point.

For example, the storage interface of computing device 120 may interface with storage node 110A (via a storage interface) to store a secret share value of $p_1(x)$ that encodes the X-coordinate, a secret share value of $p_2(x)$ that encodes the Y-coordinate, and a secret share value of $p_3(x)$ that encodes the orientation θ of a minutiae point. Computing device 120 may also use the storage interface to interface with storage node 110B to store another secret share value of $p_1(x)$ that encodes the X-coordinate, another secret share value of $p_2(x)$ that encodes the Y-coordinate, and another secret share value of $p_3(x)$ that encodes the orientation. Computation engine 122 may further use the storage interface to interface with storage node 110N to store yet another secret share value of $p_1(x)$ that encodes the X-coordinate, another secret share value of $p_2(x)$ that encodes the Y-coordinate, and another secret share value of $p_3(x)$ that encodes the orientation.

In some examples, the storage nodes 110 that store secret shares 112 are accessible only for re-enrollment (illustrated by the disconnected arrow between computing device 120 to storage nodes 110). That is, storage nodes 110 that store secret shares 112 may be physically disconnected from a network and only configured with temporary access during initial enrollment and during re-enrollment, if needed.

In the event of a security breach or update, instead of having to acquire additional or repeat biometric information for each of the users to generate new helper data, computing device 120 coordinates computation of new helper data 126' (e.g., by using a generate function of a fuzzy extractor or a similar scheme such as a fuzzy vault) using the distributed, secure secret shares 112 so that the original biometric information is never revealed by the distributed storage nodes 110 or reconstituted in its entirety by computing device 120 coordinating the process. For example, in one implementation, message handler 128 may output a plurality of messages 116 to instruct each of the distributed storage nodes 110 to apply the generate function of the fuzzy extractor or any similar scheme to generate a respective new helper data share 114 in accordance with the respective secret shares 112 of the biometric information stored by the storage node 110 in secret share format. Each storage node 110 sends their respective new helper data share 114 to computing device 110, which in turn determines, e.g., by combining the respective new helper data shares 114 to recover a new polynomial resulting from the distributed application of the generate function of the fuzzy extractor, which in turn is used to generate new helper data 126' for subsequent authentication of the user.

For example, when re-enrollment is required and after storage nodes 110 are made accessible, message handler 128 may output a plurality of messages, e.g., messages 116A-116N (collectively, "messages 116") to instruct each of storage nodes 110 to generate respective shares of a new helper data, e.g., new helper data shares 114. For example, storage node 110A may receive message 116A from computing device 120 and may generate a respective share of a new helper data, e.g., new helper data share 114A using secret shares 112A stored in storage node 110A. Similarly, storage node 110B may receive message 116B from computing device 120 and may generate a respective share of a new helper data, e.g., new helper data share 114B using secret shares 112B stored in storage node 110B. Storage device 110N may also receive message 116N from computing device 120 and may generate a respective share of a new helper data, e.g., new helper data share 114N using secret shares 112N stored in storage node 110N.

To generate new helper data using shares 112, each of storage nodes 110 may, for example, be instructed to perform a sequence of operations such as addition and multiplication operations to compute the generate function of a fuzzy extractor scheme in a secure distributed manner without reconstructing the secret shared biometric and thus generating new helper data shares 114. For example, storage node 110A may add the secret shared values in secret shares 112A (e.g., $p_{sum}(x)=p_1(x)+p_2(x)+p_3(x)]$) stored in storage node 110A to generate new helper data share 114A. Similarly, storage node 110B may add the secret shared values in secret shares 112B stored in storage node 110B to generate new helper data share 114B. Likewise, storage node 110N may add the secret shared values in secret shares 112N stored in storage node 110N to generate new helper data share 114N. That is, each of storage nodes 110 generate a respective share of the new helper data that is in secret shared format.

Alternatively, or additionally, storage nodes 110 may use, for example, a multiplication operations to compute the generate function of a fuzzy extractor scheme in a secure distributed manner without reconstructing the secret shared biometric and thus generating new helper data shares 114.

For example, storage node 110A may multiply secret shares 112A of the biometric information stored in storage node 110A. The product of secret shares 112A is used with a shared multiplication triple (e.g., a*b=c) to generate shares of a new polynomial that has encoded the product of the secret shared values in secret shares 112A. Similarly, storage node 110B may multiply the secret shared values in secret shares 112B stored in storage node 110B such that the product of the secret shared values in secret shares 112B is used with a shared multiplication triple (e.g., a*b=c) to generate shares of a new polynomial that has encoded the product of the secret shared values in secret shares 112B. Likewise, storage node 110N may multiply the secret shared values in secret shares 112N stored in storage node 110N such that the product of the secret shared values in secret shares 112N is used with a shared multiplication triple (e.g., a*b=c) to generate shares of a new polynomial that has encoded the product of the secret shared values in secret shares 112N. Although described using a multiplication triples technique, storage nodes 110 may use other multiplication techniques, such as homomorphic encryption, to generate new helper data shares 114.

After computing new helper data shares 114, storage nodes 110A-110N may send a plurality of messages, e.g., messages 116, including the new helper data shares 114A-114N, respectively, to computing device 120 for which computation engine 122 of computing device 120 may determine, in accordance with the new helper data shares 114, the new helper data, e.g., new helper data 126', for subsequent authentication of users 106. For example, computation engine 122 may combine the new helper data shares 114 received from storage nodes 110 to recover a new polynomial resulting from the distributed application of the generate function of the fuzzy extractor. Computation engine 122 may apply interpolation to the recovered polynomial to generate a constant for the polynomial for use as the new helper data 126'.

In this way, biometric authentication systems, such as biometric authentication system 100, may generate new helper data without receiving additional or repeat biometric information of a user and without having to recover or otherwise reuse the original biometric at any centralized, potentially insecure node or device, thereby providing technical solutions that enable faster and secure re-enrollment using potentially less computational resources and without putting at risk biometric information of the users.

Figure 2C:
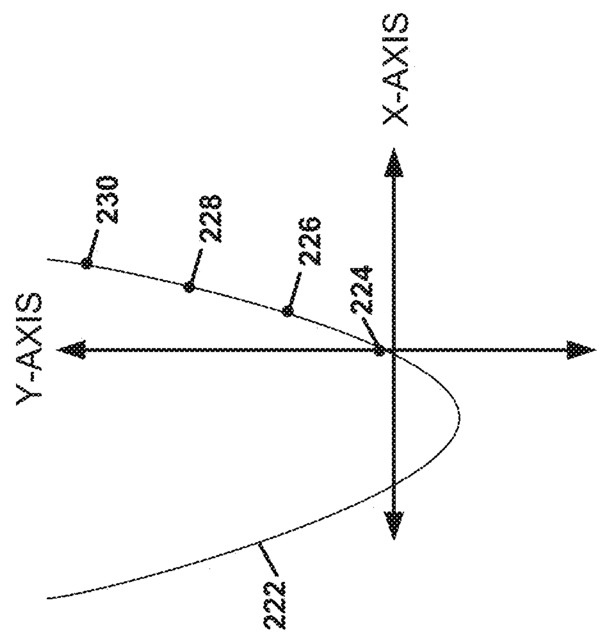
FIGS. 2A-2C are graphs illustrating example polynomials used for encoding biometric information, in accordance with one or more aspects of this disclosure.
Figure 2B:
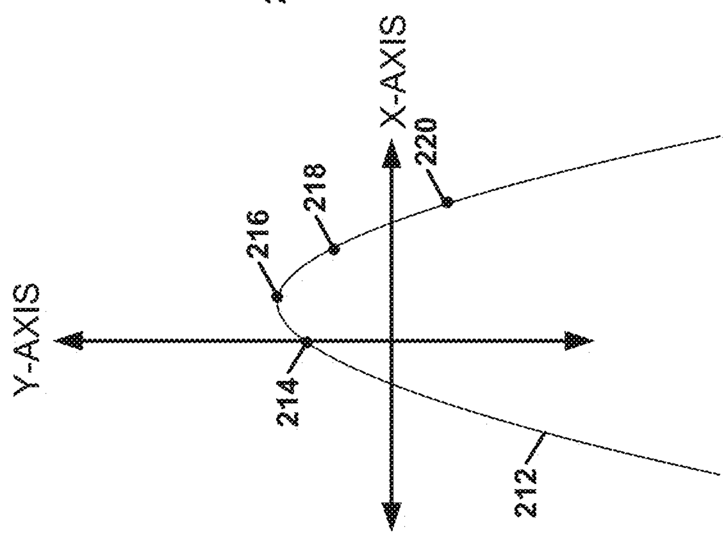
Figure 2A:
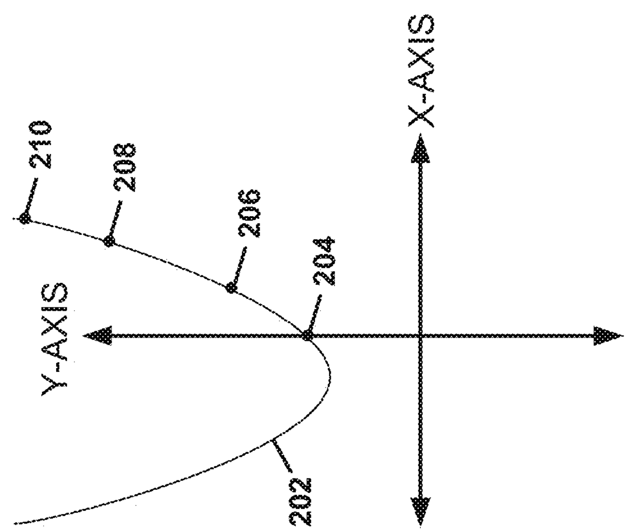

FIGS. 2A-2C are graphs illustrating example polynomials 202, 212, and 222 that can be used for encoding biometric information, in accordance with one or more aspects of this disclosure. FIGS. 2A-2C are not drawn to scale and are collectively illustrated as one example in which three polynomials are used to encode respective portions of biometric information representative of a fingerprint in accordance with the techniques described herein. Although FIGS. 2A-2C are used as an example for encoding biometric information of a fingerprint, FIGS. 2A-2C may represent any polynomial used to encode indicia of any type of biometric information.

In the example of FIG. 2A, polynomial 202 is used to secretly share the X-coordinate ($X_1$) of a minutiae point, $X_1, Y_1, \theta_1$, of a fingerprint. For ease of illustration, polynomial 202 is a parabola, where at least three secret shared values are required to determine an encoded value in the parabola, but may be defined as any polynomial of degree "t−1" where "t" is the number of secret shared values needed to determine an encoded value in the polynomial. The free term, e.g., point 204 of polynomial 202 ($p_1(0)$), may represent an encoded value of a portion of the biometric information, e.g., an integer representing the X-coordinate ($X_1$) of a minutiae point, $X_1, Y_1, \theta_1$. For example, $p_1(0)$ may represent the point where the graph intersects the Y-axis and where X=0. In the example of FIG. 2A, $p_1(0)$ may have a value of 10. Since "t" is three, shares generation unit 124 may configure two random coefficient values ("t−1") such as 3 and 23. Polynomial 202 is therefore, $f(x)=10+3x+23x^2$. To encode the X-coordinate of the fingerprint at point 204 (e.g., 10), polynomial 202 is evaluated at "n" points that are secret shared values used to determine an encoded value at point 204 in polynomial 202. For example, computation engine 122 of FIG. 1 may compute secret share values 206, 208, and 210 from polynomial 202 (e.g., $p_1(x)=(x, f(x))$). For ease of illustration, polynomial 202 is illustrated with three evaluated secret share values (e.g., 206, 208, and 210), but may include more secret shared values from polynomial 202. Continuing the example above, secret shared value 206, where x=1, may represent a first value (e.g., $p_1(x)=(1, 36)$) of polynomial 202, secret shared value 208, where x=2, may represent a second value (e.g., $p_1(x)=(2, 105)$) of polynomial 202, and secret shared value 210, where x=3, may represent a third value (e.g., $p_1(x)=(3, 226)$) of polynomial 202. Shares generation unit 124 of computation engine 122 may store each of secret shared values 206, 208, and 210 in corresponding storage nodes 110 of FIG. 1.

In the example of FIG. 2B, polynomial 212 is used to secretly share the Y-coordinate ($Y_1$) of the minutiae point, $X_1, Y_1, \theta_1$, of the biometric information representing the fingerprint. For ease of illustration, polynomial 212 is a parabola, where at least three secret shared values are required to determine an encoded value in the parabola, but may be defined as any polynomial of degree "t−1" where "t" is the number of secret shared values needed to determine an encoded value in the polynomial. The free term, e.g., point 214 of polynomial 212 ($p_2(0)$), may represent an encoded value of a portion of the biometric information, e.g., an integer representing the Y-coordinate ($Y_1$) of the minutiae point, $X_1, Y_1, \theta_1$. For example, $p_2(0)$ may represent the point where the graph intersects the Y-axis and where X=0. In the example of FIG. 2B, $p_2(0)$ may have a value of 15. Since "t" is three, secret shares generation unit 124 may configure two random coefficient values ("t−1") such as 7 and −5. Polynomial 202 is therefore, $f(x)=15+7x-5x^2$. To encode the Y-coordinate of the fingerprint at point 214 (e.g., 15), polynomial 212 is evaluated at "n" points that are secret shared values used to determine an encoded value at point 214 in polynomial 212. For example, computation engine 122 of FIG. 1 may compute secret shared values 216, 218, and 220 from polynomial 212 (e.g., $p_2(x)=(x, f(x))$). For ease of illustration, polynomial 212 is illustrated with three secret shared values (e.g., 216, 218, and 220), but may include more secret shared values from polynomial 212. Continuing the example above, secret shared value 216, where x=1 may represent a first value (e.g., $p_2(x)=(1, 17)$) of polynomial 212, secret share value 218, where x=2, may represent a second value (e.g., $p_2(x)=(2, 9)$) of polynomial 212, and secret share value 220, where x=3, may represent a third value (e.g., $p_2(x)=(3, -9)$) of polynomial 212. Shares generation unit 124 of computation engine 122 may store each of secret share values 216, 218, and 220 in corresponding storage nodes 110 of FIG. 1.

In the example of FIG. 2C, polynomial 222 is used to secretly share the Orientation ($O_1$) of the minutiae point, $X_1, Y_1, \theta_1$, of the biometric information representing the fingerprint. For ease of illustration, polynomial 222 is a parabola, where at least three secret share values are sufficient to determine an encoded value in the parabola, but may be defined as any polynomial of degree "t−1" where "t" is the number of secret share values needed to determine an encoded value in the polynomial. The free term, e.g., point 224 of polynomial 222 ($p_3(0)$), may represent an encoded value of a portion of the biometric information, e.g., an integer representing the Orientation ($\theta_1$) of a minutiae point, $X_1, Y_1, \theta_1$. For example, $p_3(0)$ may represent the point where the graph intersects the Y-axis and where X=0. In the example FIG. 2C, $p_3(0)$ may have a value of 6. Since "t" is three, shares generation unit 124 may configure two random coefficient values ("t−1") such as 14 and 5. Polynomial 222 is therefore, $f(x)=6+14x+5x^2$. To encode the orientation of the fingerprint at point 224 (e.g., 6), polynomial 222 is evaluated at "n" points that are secret share values used to determine an encoded value at point 224 in polynomial 222. For example, computation engine 122 of FIG. 1 may compute shares 226, 228, and 230 from polynomial 222 (e.g., $p_3(x)=(x, f(x))$). For ease of illustration, polynomial 222 is illustrated with three secret share values (e.g., 226, 228, and 230), but may include more secret share values from polynomial 222. Continuing the example above, secret share value 226, where x=1, may represent a first value (e.g., $p_3(x)=(1, 25)$) of polynomial 222, secret share value 228, where x=2, may represent a second value (e.g., $p_3(x)=(2, 54)$) of polynomial 222, and secret share value 230, where x=3, may represent a third value (e.g., $p_3(x)=(3, 93)$) of polynomial 222. Shares generation unit 124 of computation engine 122 may store each of secret share values 226, 228, and 230 in corresponding storage nodes 110 of FIG. 1.

Storage nodes 110 may generate the new helper data shares 114 in accordance with the secret share values described above. For example, storage node 110A may generate a first new helper data share by multiplications and sums including computing a sum (e.g., $p_{sum1}(x)$) of secret share values 206, 216, and 226 of polynomials 202, 212, and 222, respectively. Similarly, storage node 110B may generate a second new helper data share by multiplications and sums including computing a sum (e.g., $p_{sum2}(x)$) of secret share values 208, 218, and 228 of polynomials 202, 212, and 222, respectively. Likewise, storage node 110N may generate a third new helper data share by multiplications and sums including computing a sum (e.g., $p_{sum3}(x)$) of secret share values 210, 220, and 230 of polynomials 202, 212, and 222, respectively. That is, each of storage nodes 110 generate a respective share of the new helper data that is in secret shared format. Storage nodes 110 may send the respective shares (e.g., $p_{sum1}(x)$, $p_{sum2}(x)$, and $p_{sum3}(x)$) of the new helper data to computing device 120 for which computation engine 122 of computing device 120 may determine the new helper data based on the respective shares of the new helper data. For example, combine the respective shares to recover the new polynomial that is encoding the new helper data.

Figure 3:
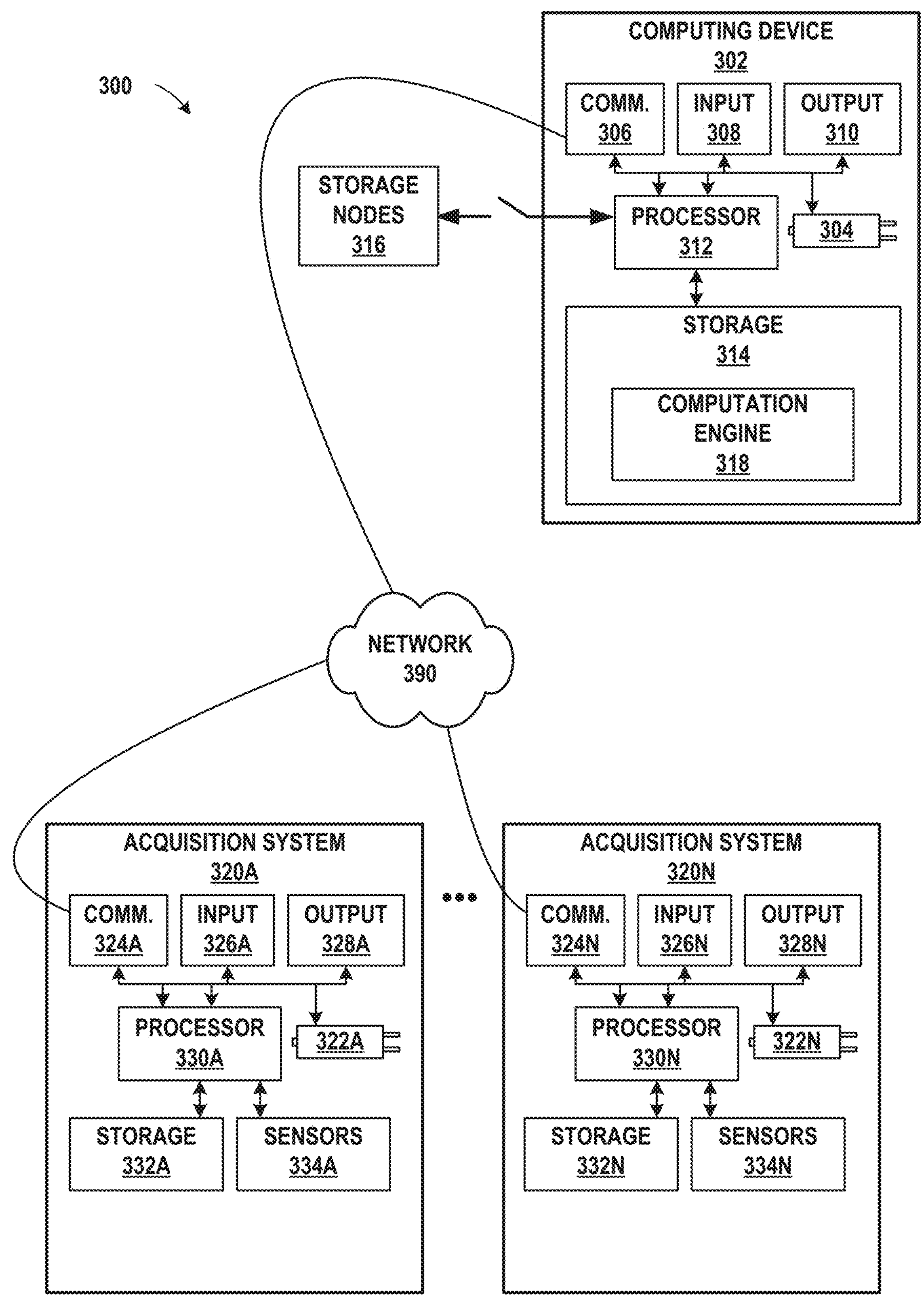
FIG. 3 is a block diagram illustrating an example biometric authentication system that is configured in accordance with one or more aspects of the present disclosure.

FIG. 3 is a block diagram illustrating an example biometric authentication system 300 that is configured in accordance with one or more aspects of the present disclosure. Biometric authentication system 300 of FIG. 3 is described below as an example or alternate implementation of biometric authentication system 100 of FIG. 1. However, FIG. 3 illustrates only one particular example or alternate implementation of biometric authentication system 100, and many other example or alternate implementations of biometric authentication system 100 may be used or may be appropriate in other instances. Such implementations may include a subset of the components included in the example of FIG. 3 or may include additional components not shown in the example of FIG. 3. Computing device 302 may communicate with acquisition systems 320A through 320N (collectively, "acquisition systems 320") through a network 390.

Computing device 302 of FIG. 3 implements computation engine 122 and shares generation unit 124 of FIG. 1. Computing device 302 includes power source 304, one or more communication units 306, one or more input devices 308, one or more output devices 310, one or more processors 312, one or more storage devices 314, and one or more storage nodes 316. One or more storage devices 314 may include a computation engine 318. One or more of the devices, modules, storage areas, or other components of computing device 302 may be interconnected to enable inter-component communications (physically, communicatively, and/or operatively). In some examples, such connectivity may be provided through a system bus, a network connection, an inter-process communication data structure, or any other method for communicating data.

Power source 304 may provide power to one or more components of computing device 302. Power source 304 may receive power from the primary alternating current (AC) power supply in a building, home, business, or other location. In other examples, power source 304 may be a battery. In still further examples, computing device 302 and/or power source 304 may receive power from another source. Power source 304 may have intelligent power management or consumption capabilities, and such features may be controlled, accessed, or adjusted by one or more modules of computing device 302 and/or by one or more processors 312 to intelligently consume, allocate, supply, or otherwise manage power.

One or more input devices 308 of computing device 302 may generate, receive, or process input. Such input may include input from a keyboard, pointing device, voice responsive system, video camera, button, sensor, biometric sensor, mobile device, control pad, microphone, presence-sensitive screen, network, or any other type of device for detecting input from a human or machine.

One or more output devices 310 of computing device 302 may generate, receive, or process output. Examples of output are tactile, audio, visual, and/or video output. Output devices 310 may include a display, sound card, video graphics adapter card, speaker, presence-sensitive screen, one or more USB interfaces, video and/or audio output interfaces, or any other type of device capable of generating tactile, audio, video, or other output. Output devices 310 may include a display device, which may function as an output device using technologies including liquid crystal displays (LCD), dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output.

One or more communication units 306 of computing device 302 may communicate with devices external to computing device 302 by transmitting and/or receiving data, and may operate, in some respects, as both an input device and an output device. In some examples, communication units 306 may communicate with other devices over a network. In other examples, communication units 306 may send and/or receive radio signals on a radio network such as a cellular radio network. In other examples, communication units 306 of computing device 302 may transmit and/or receive satellite signals on a satellite network such as a Global Positioning System (GPS) network. Examples of communication units 306 include a network interface card (e.g. such as an Ethernet card), an optical transceiver, a radio frequency transceiver, a GPS receiver, or any other type of device that can send and/or receive information. Other examples of communication units 306 may include Bluetooth®, GPS, 3G, 4G, LTE, and Wi-Fi® radios found in mobile devices as well as Universal Serial Bus (USB) controllers and the like. In accordance with aspects of this disclosure, communication units 306 may receive data, e.g., images of biometric samples, from acquisition systems 320.

One or more processors 312 of computing device 302 may implement functionality and/or execute instructions associated with computing device 302. Examples of processors 312 include microprocessors, application processors, display controllers, auxiliary processors, one or more sensor hubs, and any other hardware configured to function as a processor, a processing unit, or a processing device. Computing device 302 may use one or more processors 312 to perform operations in accordance with one or more aspects of the present disclosure using software, hardware, firmware, or a mixture of hardware, software, and firmware residing in and/or executing at computing device 302.

One or more storage devices 314 within computing device 302 may store information for processing during operation of computing device 302. In some examples, one or more storage devices 314 are temporary memories, meaning that a primary purpose of the one or more storage devices is not long-term storage. Storage devices 314 on computing device 302 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 314, in some examples, also include one or more computer-readable storage media. Storage devices 314 may be configured to store larger amounts of information than volatile memory. Storage devices 314 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Storage devices 314 may store program instructions and/or data associated with one or more of the modules described in accordance with one or more aspects of this disclosure.

One or more processors 312 and one or more storage devices 314 may provide an operating environment or platform for one or one more modules, which may be implemented as software, but may in some examples include any combination of hardware, firmware, and software. One or more processors 312 may execute instructions and one or more storage devices 314 may store instructions and/or data of one or more modules. The combination of processors 312 and storage devices 314 may retrieve, store, and/or execute the instructions and/or data of one or more applications, modules, or software. Processors 312 and/or storage devices 314 may also be operably coupled to one or more other software and/or hardware components, including, but not limited to, one or more of the components illustrated in FIG. 3.

One or more modules illustrated in FIG. 3 as being included within storage devices 314 (or modules otherwise described herein) may perform operations described using software, hardware, firmware, or a mixture of hardware, software, and firmware residing in and/or executing at computing device 302. Computing device 302 may execute each of the module(s) with multiple processors or multiple devices. Computing device 302 may execute one or more of such modules as a virtual machine executing on underlying hardware. One or more of such modules may execute as one or more services of an operating system or computing platform. One or more of such modules may execute as one or more executable programs at an application layer of a computing platform.

One or more storage nodes 316 may store information such as one or more shares computed according to biometric information, in accordance with the techniques described herein. In some examples, storage nodes 316 may represent local or remote storage units for storing computer-readable data. For example, storage nodes 110 may represent any or all of hard drives, flash drives, Universal Storage Bus (USB) devices, tape drives, hard drives, floppy disks, compact disks, removable storage devices, etc. that are physically coupled to computing device 302. The combination of processors 312 and storage nodes 316 may function as a storage interface to retrieve, store, and/or execute the instructions and/or data of one or more applications, modules, or software. Processors 312 and/or storage nodes 316 may also be operably coupled to one or more other software and/or hardware components, including, but not limited to, one or more of the components illustrated in FIG. 3.

Computation engine 318 may generally perform tasks relating to computation engine 122 as described elsewhere in this disclosure. For example, execution of instructions associated with computation engine 318 may configure computing device 302 to receive biometric information from one or more acquisition systems 320. Execution of instructions associated with computation engine 318 may cause computing device 302 to generate helper data according to biometric information of a user for authenticating the user. Moreover, execution of instructions association with computation engine 318 may cause computing device 302 to generate a plurality of secret shares of the biometric information according to the biometric information of the user. Additionally, execution of instructions associated with computation engine 318 may cause computing device 302 to store each of the plurality of secret shares of the biometric information to a corresponding one of storage nodes 316. Furthermore, execution of instructions associated with computation engine 318 may configure computing device 302 to perform a re-enrollment of the biometric information by outputting a message to instruct each of storage nodes 316 to generate a respective share of a new helper data in accordance with the plurality of secret shares of the biometric information and a secure protocol, secure multi-party protocol or similar techniques, receiving a respective share of the new helper data from two or more of storage nodes 316, and determine the new helper data based on the respective share of the new helper data from each of the two or more storage nodes 316, wherein the re-enrollment occurs without receiving additional or repeat biometric information of a user and thereby results in faster re-enrollment.

Computation engine 318 may interact with and/or operate in conjunction with one or more modules of computing device 302. Computation engine 318 may receive biometric information and other inputs. Computation engine 318 may receive biometric information from communication units 306.

Acquisition system 320A of FIG. 3 may include power source 322A, one or more communication units 324A, one or more input devices 326A, one or more output devices 328A, one or more processors 330A, one or more storage devices 332A, and one or more sensors 334A. One or more of the devices, modules, storage areas, or other components of acquisition system 320A may be interconnected to enable inter-component communications (physically, communicatively, and/or operatively). In some examples, such connectivity may be provided through a system bus, a network connection, an inter-process communication data structure, or any other method for communicating data. Correspondingly, acquisition system 320N may include power source 322N, one or more communication units 324N, one or more input devices 326N, one or more output devices 328N, one or more processors 330N, one or more storage devices 332N, and one or more sensors 334N, which may include the same or similar capability, features, and/or functionality as similarly numbered components of acquisition system 320A. In some examples, and for certain acquisition systems 320, one or more components, devices, or modules shown in FIG. 3 as being included within one or more acquisition systems 320 may be optional.

Certain aspects of acquisition systems 320 are described below with respect to acquisition system 320A. Other acquisition systems 320 may be described similarly, and may also include the same, similar, or corresponding components, devices, modules, functionality, and/or other features. Descriptions herein with respect to acquisition system 320A may correspondingly apply to one or more other acquisition systems 320. In some examples, and as may be noted, one or more acquisition systems 320 may include more or fewer capabilities, features, components, and/or functionality than other acquisition systems 320.

Power source 322A may provide power to one or more components of acquisition system 320A. In some examples, power source 322A may be a battery. In other examples, power source 322A may receive power from the primary alternating current (AC) power supply in a building, home, or other location. In still further examples, acquisition system 320A and/or power source 322A may receive power from another source. Power source 322A may have intelligent power management or consumption capabilities, and may such features may be controlled, accessed, or adjusted by one or more modules of acquisition system 320A and/or by one or more processors 330A to intelligently consume, allocate, supply, or otherwise manage power.

One or more input devices 326A of acquisition system 320A may generate, receive, or process input. Such input may include input from a keyboard, pointing device, voice responsive system, video camera, button, sensor, biometric sensor, mobile device, control pad, microphone, presence-sensitive screen, network, or any other type of device for detecting input from a human or machine. One or more output devices 328A of acquisition system 320A may generate, receive, or process output. Examples of output are tactile, audio, visual, and/or video output. Output devices 328A may include a display, sound card, video graphics adapter card, speaker, presence-sensitive screen, one or more USB interfaces, video and/or audio output interfaces, or any other type of device capable of generating tactile, audio, video, or other output. Output devices 328A may include a display device, which may function as an output device using technologies including liquid crystal displays (LCD), dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In some examples, acquisition system 320A may include a presence-sensitive display that may serve as a user interface device that operates both as one or more input devices 326A and one or more output devices 328A.

One or more communication units 324A of acquisition system 320A may communicate with devices external to acquisition system 320A by transmitting and/or receiving data, and may operate, in some respects, as both an input device and an output device. In some examples, communication unit 324A may communicate with other devices over a network 390. In other examples, communication units 324A may send and/or receive radio signals on a radio network such as a cellular radio network. In other examples, communication units 324A of acquisition system 320A may transmit and/or receive satellite signals on a satellite network such as a Global Positioning System (GPS) network. Examples of communication units 324A include a network interface card (e.g. such as an Ethernet card), an optical transceiver, a radio frequency transceiver, a GPS receiver, or any other type of device that can send and/or receive information. Other examples of communication units 324A may include Bluetooth®, GPS, 3G, 4G, LTE, and Wi-Fi® radios found in mobile devices as well as Universal Serial Bus (USB) controllers and the like.

One or more processors 330A of acquisition system 320A may implement functionality and/or execute instructions associated with acquisition system 320A. Examples of processors 330A include microprocessors, application processors, display controllers, auxiliary processors, one or more sensor hubs, and any other hardware configured to function as a processor, a processing unit, or a processing device. Acquisition system 320A may use one or more processors 330A to perform operations in accordance with one or more aspects of the present disclosure using software, hardware, firmware, or a mixture of hardware, software, and firmware residing in and/or executing at acquisition system 320A.

One or more storage devices 332A within acquisition system 320A may store information for processing during operation of acquisition system 320A. In some examples, one or more storage devices 332A are temporary memories, meaning that a primary purpose of the one or more storage devices is not long-term storage. Storage devices 332A on acquisition system 320A may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 332A, in some examples, also include one or more computer-readable storage media. Storage devices 332A may be configured to store larger amounts of information than volatile memory. Storage devices 332A may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Storage devices 332A may store program instructions and/or data associated with one or more of the modules described in accordance with one or more aspects of this disclosure.

One or more processors 330A and one or more storage devices 332A may provide an operating environment or platform for one or one more modules, which may be implemented as software, but may in some examples include any combination of hardware, firmware, and software. One or more processors 330A may execute instructions and one or more storage devices 332A may store instructions and/or data of one or more modules. The combination of processors 330A and storage devices 332A may retrieve, store, and/or execute the instructions and/or data of one or more applications, modules, or software. Processors 330A and/or storage devices 332A may also be operably coupled to one or more other software and/or hardware components, including, but not limited to, one or more of the components illustrated in FIG. 3.

Figure 4:
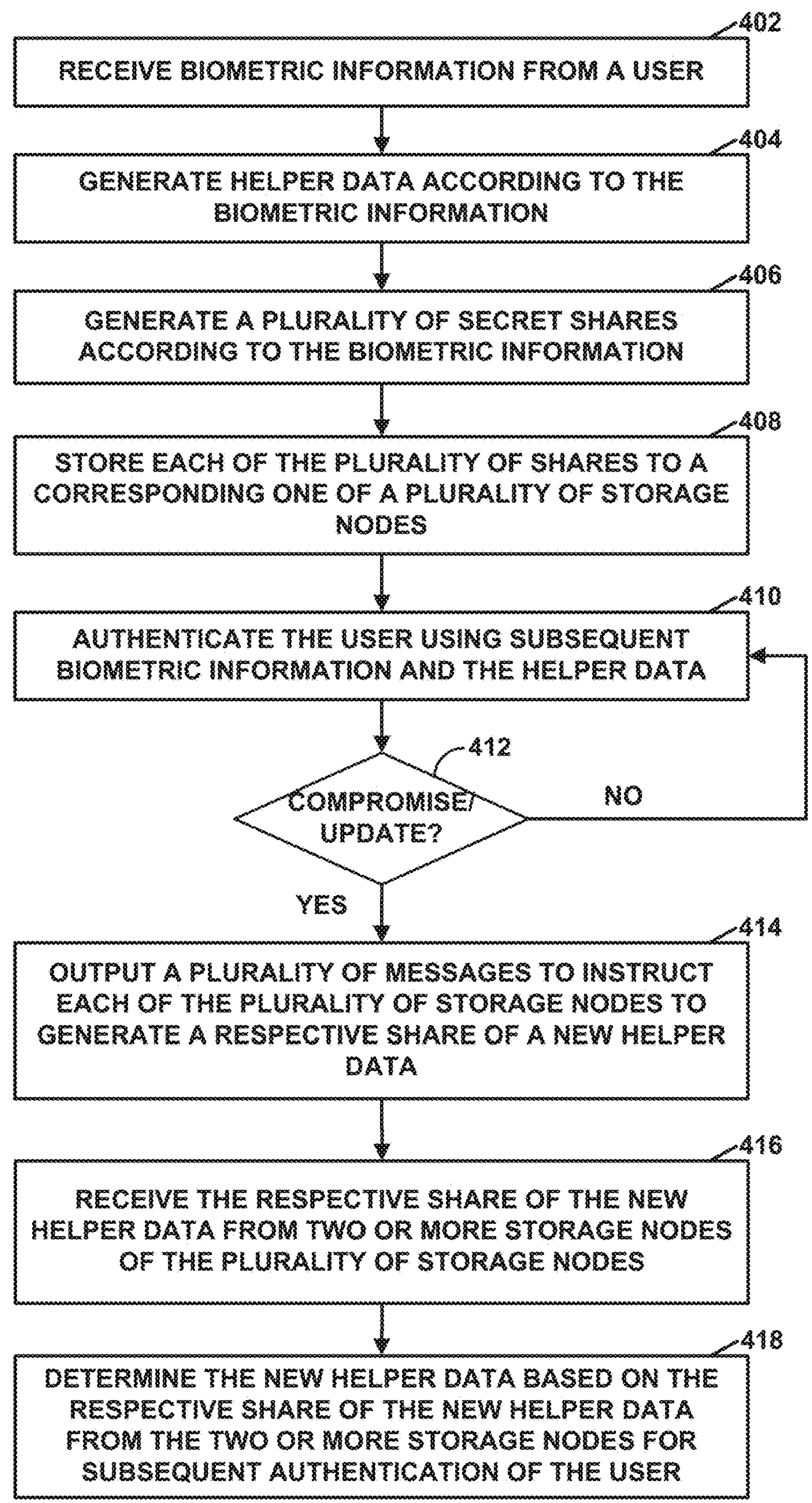
FIG. 4 is a flowchart illustrating an example operation of the computing device, in accordance with one or more aspects described in this disclosure.

FIG. 4 is a flowchart illustrating an example operation of the computing device, in accordance with the techniques described in this disclosure. Although the method of FIG. 4 is described with respect to computing device 120 of FIG. 1, it should be understood that computing device 302 of FIG. 3 may also be configured to perform this or a similar method.

Computing device 120 receives biometric information from a user (402). For example, one of biometric sensors 104 reads a biometric sample from user 106. Acquisition system 102 receives the biometric information and sends the biometric information to computing device 120. Computation engine 122 of computing device 120 may construct a biometric template (e.g., reference biometric template) according to the biometric information. For example, in response to receiving an image of a fingerprint, computation engine 122 may divide the fingerprint image into blocks that each includes a part of the image of the fingerprint. Computation engine 122 determines the coordinates of indicia of the fingerprint in each block (in relation to other blocks) and an orientation of the indicia of the fingerprint (e.g., the direction of an underlying ridge or bifurcation at a particular coordinate). Using these coordinates and orientation of the indicia of the fingerprint, computation engine 122 constructs a biometric template.

Computation engine 122 of computing device 120 may generate helper data according to the biometric information (404). For example, computation engine 122 may use cryptographic algorithms, e.g., fuzzy extractor scheme, fuzzy vault or similar schemes, to generate helper data. The helper data is obtained by binding a key with the biometric template such that the helper data is used to reconstruct the key to authenticate a user.

Computation engine 122, via shares generation unit 124, generates a plurality of secret shares according to the biometric information (406). For example, shares generation unit 124 may convert each of the coordinates and orientations of the biometric template to an integer to be stored in the free term of a respective polynomial (e.g., $p_1(0)=X_1$, $p_2(0)=Y_1$, and $p_3(0)=\theta_1$). Each of the polynomials (e.g., $p_1(x)$, $p_2(x)$, and $p_3(x)$) may be used to encode the integer of a single minutiae point of the biometric template (e.g., $(X_1, Y_1, \theta_1)$). Shares generation unit 124 may evaluate each polynomial at "n" points (e.g., $p_1(1)$, $p_1(2)$, $p_1(3)$) of the polynomial (e.g., $p_1(x)$) used to encode a value within the polynomial (e.g., $X_1$ of minutiae point $(X_1, Y_1, \theta_1)$).

Computing device 120, via a storage interface for interfacing with plurality of storage nodes 110, stores each of the plurality of secret shares to a corresponding one of a plurality of storage nodes (408). In some examples, computing device 120 may use a storage interface to configure connectivity for plurality of storage nodes 110 as offline upon storing each of the plurality of shares to the corresponding one of the plurality of storage nodes.

Computation engine 122 may authenticate the user using subsequent biometric information of the user and the helper data (410). For example, computation engine 122 uses the helper data generated during initial enrollment together with the subsequent biometric information to reconstruct a digital key that is used to authenticate the user.

In the absence of a security breach or update ("NO" branch of step 412), computation engine 122 continues to use the helper data generated during initial enrollment together with the subsequent biometric information to reconstruct a digital key that is used to authenticate the user.

In the event of a security breach or update ("YES" branch of step 412), computation engine 122 performs a re-enrollment of the biometric information by: outputting a plurality of messages to instruct each of the plurality of storage nodes to generate a respective share of a new helper data in accordance with the plurality of secret shares of the biometric information (414) and using a secure protocol, receiving the respective share of the new helper data from two or more storage nodes of the plurality of storage nodes (416), and determining the new helper data based on the respective share of the new helper data from each of the two or more storage nodes for subsequent authentication of the user (418). In this way, computing device 120 may use the storage interface to retrieve respective shares of the new helper data from corresponding storage nodes 110 such that computation engine 122 may determine the new helper data based on the respective shares of the new helper data without having to recover or otherwise reuse the original biometric information for a user and without having to re-acquire additional or repeat biometric information of the user. Further details regarding the re-enrollment operation are described with respect to FIG. 5 below.

Figure 5:
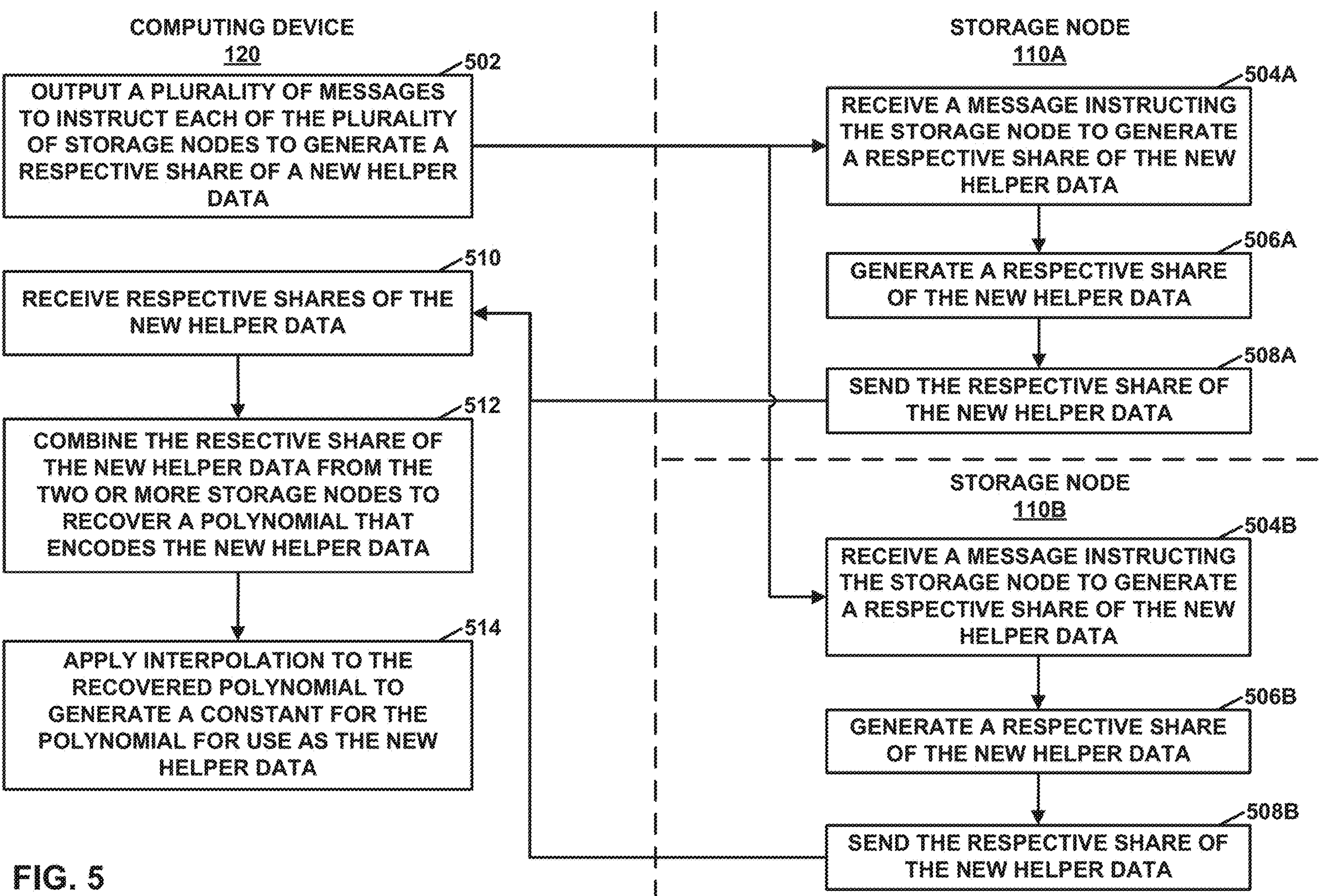
FIG. 5 is a flowchart illustrating an example re-enrollment operation of the computing device, in accordance with one or more aspects described in this disclosure.

FIG. 5 is a flowchart illustrating an example re-enrollment operation in more detail, in accordance with the techniques described in this disclosure. The example of FIG. 5 is described with respect to storage nodes 110A and 110B of FIG. 1, but may include any two or more storage nodes 110 of FIG. 1.

In the example of FIG. 5, computing device 120 may output a plurality of messages to instruct each of the plurality of storage nodes (e.g., storage node 110A and 110B) to generate a respective share of a new helper data in accordance with the plurality of secret shares of the biometric information and a secure protocol or similar techniques (502). In some examples, computing device 120 may use the storage interface to automatically reconfigure connectivity for storage nodes 110A and 110B as online when performing re-enrollment. In response to storage nodes 110A and 110B becoming online, computing device 120 may output a plurality of messages, via message handler 128, to storage nodes 110A and 110B, such that storage nodes 110A and 110B may each generate a respective share of the new helper data.

Storage nodes 110A and 110B may receive messages (504A and 504B), and may each generate a respective share of the new helper data through communication with other storage nodes. For example, storage node 110A may generate a share of the new helper data according to the secret shares stored in storage node 110A (506A). Storage node 110B may generate another share of the new helper data according to the secret shares stored in storage node 110B (506B). For example, storage nodes 110A, 110B may each be instructed to perform a sequence of operations such as addition and multiplication operations to compute the generate function of a fuzzy extractor scheme in a secure distributed manner without reconstructing the secret shared biometric and thus generating new helper data shares 114.

Storage nodes 110A and 110B may send the respective shares of the new helper data to computing device 120 (508A and 508B). For example, storage nodes 110A and 110B may each send a message including the respective share of the new helper data to computing device 120. In this way, the secret shares of the biometric information that are stored in storage nodes 110A and 110B are not revealed when generating new helper data for re-enrollment.

Computing device 120 may receive the respective shares of the new helper data (510). For example, computing device 120 may use the storage interface to receive a respective share of a new helper data from storage nodes 110A and 110B. In some examples, computing device 120 may use the storage interface to configure storage nodes 110A and 110B as offline in response to receiving the respective shares of the new helper data from storage nodes 110A and 110B.

Computing device 120 may determine the new helper data based on the respective shares of the new helper data from storage nodes 110A and 110B for subsequent authentication of the user. For example, computation engine 122 of computing device 120 may combine the respective shares of the new helper data from storage nodes 110A and 110B to recover a new polynomial that encodes the new helper data (512). Computation engine 122 may apply interpolation to the recovered polynomial to generate a constant for the polynomial for use as the new helper data (514).

The discussion of FIGS. 1-5 above has presented techniques for performing biometric re-enrollment using secure distributed secret sharing within a networked authentication system. As described above, the techniques enable re-enrollment and computation of new helper data for user authentication without having to recover or otherwise reuse the original biometric information for a user and without having to re-acquire additional or repeat biometric information of the user. The techniques include utilizing a distributed secret sharing process with a plurality of secure servers to generate and store a plurality of secret shares of helper data.

The discussion of FIGS. 6-14 below describes aspects of techniques for biometric authentication with template privacy and non-interactive re-enrollment, which may include "personal device assisted re-enrollment" techniques. The description below may re-use or re-define variable names, such as d and w, also used in FIGS. 1-5. The scope of definitions for such variable names should be understood within the context of FIGS. 6-14. In one or more aspects, authentication is a two-party protocol, executed between the user and an authenticator, without involvement of external parties. In one or more aspects, a third-party personal device (referred to as an auxiliary service or in some cases as an auxiliary system), belonging to, or chosen by, the user may facilitate non-interactive re-enrollment. The enterprise is not required to deploy any additional infrastructure (i.e., not required to deploy and maintain re-enrollment servers). The user is not required to trust the enterprise with the user's biometric, because a share of such biometric is kept on a user's personal device (or, alternatively, in a third-party cloud service trusted by the user). Moreover, even in the case of compromise of one of the authenticator or the auxiliary service, the user's biometric is still safe as long as the same attacker is unable to compromise both the authenticator and the auxiliary service.

In one or more aspects, the enterprise may only be responsible for the deployment of its authenticator, which can handle everyday user authentication requests. When re-enrollment is desired, the authenticator and the auxiliary system can work together as described below to generate new helper data for a fresh secret. User presence is not required in the re-enrollment procedure. Further, the user's RBT is not stored in clear form in any of the parties.

In the discussion that follows, an RBT corresponding to a user U can be represented by:

$$RBT_U=\{p_1, \ldots, p_M\}, \tag{1}$$

where $p_1, \ldots, p_M$ are data points representing unique details of U's biometric. For instance, in fingerprint RBTs each $p_i \in RBT_U$ represents the location and orientation of the fingerprint's minutiae. Minutiae are regions in the fingerprint image in which fingerprint lines merge and/or split. In turn, each minutiae point can be encoded as:

$$p_i=(x_i, y_i, \theta_i), \tag{2}$$

where, $x_i$ and $y_i$ are Cartesian coordinates and $\theta_i$ the angle representing the orientation of the minutiae $p_i$. Similar encoding techniques can be used for other biometrics such as iris scans.

FIG. 14 provides example fingerprints and example minutiae points determined from the fingerprints. In the example illustrated in FIG. 14, image 1402 represents an image of a user's fingerprint obtained at a first point in time. Image 1406 represents the fingerprint 1402 after it has been reoriented and minutiae points have been determined (indicated by white squares). Image 1404 represents an image of the same user's fingerprint obtained at a second point in time. Image 1408 represents the fingerprint 1404 after it has been reoriented and minutiae points have been determined. As can be seen from the images, many of the minutiae points are at the same location in images 1406 and 1408.

In one or more aspects, secret sharing, secure multi-party computation, and fuzzy vaults can be used to enroll, authenticate, and re-enroll a user in a biometric authentication system. A description of these techniques will now be provided, followed by a description of their use in enrollment, authentication, and re-enrollment operations.

Secret Sharing

In one or more aspects, secret sharing is used to maintain the security of the user's biometric information. In K-out-of-N secret sharing, a dealer distributes a secret to N parties such that subsets of at least K parties can recover it. Knowing up to K−1 or less shares leaks no information about the secret. As further described below, 2-out-of-2 secret shares can be generated from an RBT. One of the secret shares is provided to the authenticator and the other one to the auxiliary system. Use of secret sharing as described below can be used to enable noninteractive re-enrollment. As long as authenticator and auxiliary system do not collude, nothing about a user's RBT can be learned by compromising one of them. In the discussion below a notation for secret sharing is as follows. Given a secret X, let $[X]_j$ denote the $j^{th}$ secret share and denote the generation of N shares of X by:

$$\{[X]_1, \ldots, [X]_N\} \leftarrow X \tag{3}$$

The reconstruction of secret X from K shares is denoted by:

$$X \leftarrow \{[X]_1 \ldots, [X]_K\} \tag{4}$$

Secure Multi-Party Computation

In one or more aspects, secure multi-party computation (MPC) is used to compute certain values. MPC protocols enable mutually distrusting parties to jointly compute a function $f$ of their private inputs while revealing no information (other than what is revealed by the output of the function) about their inputs to the other parties. These guarantees are typically ensured up until a certain threshold for the minimum number of honest parties. In the Honest-But-Curious (HBC) model corrupted parties collaborate to learn private inputs of other parties but they do not deviate from the protocol specification for $f$'s computation. In the Malicious model, corrupted parties collude and can deviate from the protocol specification, and attempt to affect the results of the computation of $f$.

In standard algebraic MPC protocols, each party typically generates shares of its input (using, for instance, Shamir's secret sharing scheme) and distributes one share to each other party. An aspect of MPC is that if one is able to compute both addition and multiplication on the shares, such that the resulting shares can be combined into the correct result for the operations, one can implement any function $f$ from these two basic operations. Different schemes have been proposed to compute addition and multiplication over private inputs.

Most of these schemes share the following common characteristics in the computation of these operations:

Addition of secret shares can be computed locally. To that purpose each party computes addition on its own secret shares. The N local results computed on the secret shares, once combined, yield the result of an addition of the actual secret(s).

Multiplication of secret shares requires communication. Even though different schemes exist, most require parties to broadcast an intermediate (blinded) result during the computation of multiplication, such that individual shares of the multiplication result can be correctly computed.

In one or more aspects, a special case of MPC involving two parties, referred to as 2PC is used to compute certain values or to control certain operations. Further, one or more aspects utilize pre-computation of multiplication triples to improve execution time.

Fuzzy Vaults

Fuzzy Vaults (FV) are designed to work with data sets such as RBTs that can be represented as unordered sets of data points as shown above in Equation 1 for fingerprints. The security of FVs relies on the infeasibility of the polynomial reconstruction problem. FVs allow using a biometric template $RBT_U$ to hide a secret k. The secret can be, for instance, some private data or a cryptographic key that can, for example, be used to authenticate the user. An FV generate construction is presented in Definition 1 shown in FIG. 12. Definitions 2 and 3 detailed in FIG. 12 state FV's completeness and (information theoretic) security.

In Definition 1, the distance threshold w can be used to control the trade-off between minimizing false acceptance (revealing k to the wrong user) and false rejection (refusing to reveal k to the rightful user).

The $FV_{GEN}$ algorithm shown in FIG. 12 can be implemented by selecting a polynomial P of degree d defined over a field $GF(2^\tau)$ and encoding (or splitting) the secret k into the d+1 coefficients ($a_i$) of P. The resulting polynomial can be defined as:

$$P_k(x)=\Sigma_{i=0}^{d} a_i x_i \tag{5}$$

where the coefficients $\{a_0, \ldots, a_d\}$ are generated from k and can be used by anyone to reconstruct k. Because P is defined over $GF(2^\tau)$, each coefficient can encode $\tau$ bits. This implies that the size of a key that can be encoded is a function of the field size and the degree of the polynomial is given by:

$$|k|=(d+1)\times\tau \tag{6}$$

After encoding k as a polynomial $P_k$, each of the $l_p$ data points in $RBT_U$ are evaluated in the polynomial $P_k$ generating a list of points in a two-dimensional plane:

$$L_P=\{(p_1,P_k(p_i)), \ldots ,(p_{l_P},P_k(p_{l_P}))\} \tag{7}$$

Note that the field must also be large enough to encode a data point from $RBT_U$ as a single field element. The resulting set $L_P$ contains points in the plane that belong to the polynomial Pk. In addition to $L_P$, a set of chaff points $L_S$ of size $l_S \gg l_P$ is generated by randomly selecting pairs $(r_x, r_y)$ where $r_x$ and $r_y \in GF(2^\tau)$ resulting in:

$$L_S=\{(r_{x,1},r_{y,1}), \ldots ,(r_{x,l_S},r_{y,l_S})\} \tag{8}$$

Finally, $L_P$ and $L_S$ are shuffled together using a random permutation its and the result is published as the helper data:

$$HD=\pi_\$(L_P+L_S) \tag{9}$$

The helper data can also include the set of public parameters $\Phi=\{F, d, l_P, H(k)\}$, where F is the field in which $P_k(x)$ is defined and d is its degree, $l_P$ is the size of $RBT_U$, i.e., the number of points in the helper data that belong to $P_k(x)$, and H(k) is a cryptographic hash of the secret k allowing one to verify if the correct secret was reconstructed using $FV_{OPEN}$.

An aspect of the FV scheme is that with d+1 distinct points $(p_i, P_k(p_i))$ that are points on $P_k(x)$, $P_k(x)$ can be interpolated and its coefficients retrieved. Thus, k can be recovered. However, finding which d+1 points to interpolate out of the $l_P+l_S$ points in the HD is unlikely if $l_P+l_S$ is sufficiently larger than d. As an example, in one or more aspects, $L_P$ can include twenty point and $L_S$ can include 200 points.

When attempting to reconstruct k from the HD using a new biometric reading $RBT'_U$, the $FV_{OPEN}$ algorithm can use a distance function (which may be defined according to the biometric type) to select, out of the $l_P p+l_S$ points in the HD, the $l_P$ points that are the closest matches to the points in $RBT'_U$. If, out of the $l_P$ selected points, at least d+1 points are points that belong to the original $L_P$, then the algorithm can interpolate the correct polynomial and recover k. To verify that k was correctly recovered, the algorithm can hash the result and compare it to H(k), which was published together with the HD. If less than d+1 correct points are among the $l_P$ points selected via distance matching, no interpolation with combinations of d+1 points out of $l_P$ will yield a match in the hash, because $P_k$ will not be interpolated correctly. Therefore, $FV_{OPEN}$ will reject $RBT'_U$.

As noted above, the distance function may vary depending on the biometric type. In one or more aspects where the biometric is a fingerprint, the following distance function may be used:

$$D(p_i,p_j)=\sqrt{(x_i-x_j)^2+(y_i-y_j)^2}+\beta\times\Delta(\theta_i,\theta_j) \tag{10}$$

where $\Delta(\theta i, \theta j)=\min(|\theta i-\theta j|, 360-|\theta i-\theta j|)$. The parameter ft can control how much importance is given to the minutiae orientation in the distance computation as compared to the Euclidean distance between the points. A data point $p_i$ can be selected from the helper data if $D(p_i,p_j)<w$ for some point in RBT', where w is a distance threshold.

In one or more aspects, the FV does not require ordered elements in $RBT_U$ and $RBT'_U$, and does not require all data points to be present in both templates. Only d+1 data points in RBT'u must be close enough to points in $RBT_U$. The polynomial degree d can act as a security parameter allowing calibration of the scheme to reduce false acceptance by increasing the required number of matching data points.

A technical problem with conventional FV implementations is that they can be commutative. Thus, in conventional FV construction, not only can a secret key k be obtained from helper data by providing $RBT_U$, but also the reverse is true: by having the secret key k and the helper data, the $RBT_U$ can be derived. This property is referred to as input commutativity. This is a technical problem in systems in which storing both the helper data and secret key is desirable, because it can allow recovering the RBT of a user, thereby violating the user's privacy. As a technical solution to this problem, one or more aspects utilize a modified implementation of the FV algorithm, referred to as non-commutative FV (ncFV). The implementation of ncFV does not suffer from input commutativity and thus this technical improvement over conventional FV implementations may provide one or more practical applications, such as reducing a number of parties required for secure authentication while facilitating biometric privacy, multiple authentication entry points, ease of use and non-interactive re-enrollment, and/or being biometric agnostic.

Systems and methods utilizing the above-described secret sharing, secure multi-party computation, and fuzzy vaults to enroll, authenticate, and re-enroll a user in a biometric authentication system will now be described.

Figure 6:
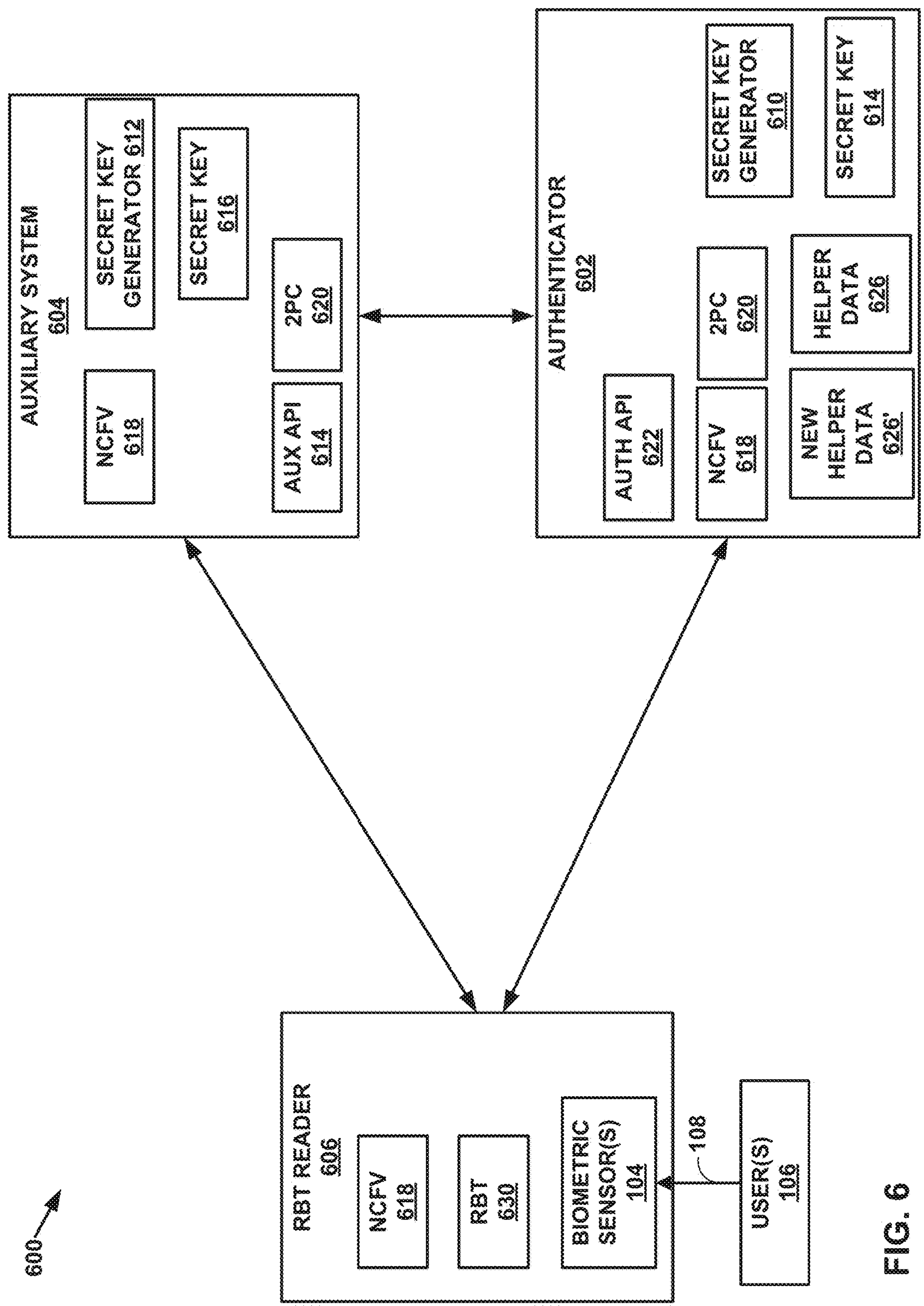
FIG. 6 is a block diagram illustrating an example biometric authentication system that is configured in accordance with one or more aspects of the disclosure.

FIG. 6 is a block diagram illustrating an example biometric authentication system 600 that is configured in accordance with one or more aspects of the disclosure. In the example illustrated in FIG. 6, biometric authentication system 600 includes at least an RBT reader 606, an authenticator 602, and an auxiliary system 604. The devices may be coupled by a communication network (not shown) with which to exchange data and messages. Each of RBT reader 606, authenticator 602, and auxiliary system 604 may be implemented using a computing device similar to computing device 302 of FIG. 3, wherein computation engine 318 having one or more processors coupled to a memory executes modules for implementing the techniques described herein.

RBT reader 606 can accept input from one or more biometric sensors 104 to acquire biometric information for one or more users. For instance, RBT reader 606 may comprise one or more biometric sensors 104 that as described above can include fingerprint scanners (capacitive or optical), palm scanners, facial recognition scanners, facial expression scanners, iris/retina scanners, infrared cameras, heart rate scanners, gait sensors (e.g., video or accelerometers), or other biometric sensors that read biometric information 108 from users 106. In some examples, the components of RBT reader 606, including biometric sensors 104, are included within one physical structure. In some examples, the biometric sensors 104 are in different physical structures.

In some examples, biometric sensors 104 may read biometric samples from users 106 seeking access and/or privileges to physical and/or virtual environments, e.g., a software application, a physical lock, or other type of secure storage or application. RBT reader 606 may receive a biometric sample (e.g., images of fingerprints) from biometric sensors 104 and determine an RBT 630 from the biometric sample. RBT reader 606 can share portions of the RBT 630 with authenticator 602 and auxiliary system 604 for use in enrollment, re-enrollment, and authentication operations as further described below.

Authenticator 602 can provide user authentication services. For example, authenticator 602 can verify the identity of a user based on biometric information of the user. Authenticator 602 can maintain helper data 626 that is created during an initial user enrollment process and associated with the user. In one or more aspects, authenticator 602 and auxiliary system 604 contribute separate portions of the helper data 626 during an enrollment or re-enrollment operation. Secret key generator 610 can be used to generate secret key 614. Secret key generator 610 can generate secret key shares, provide secret key shares to auxiliary system 604, and receive secret key shares generated by auxiliary system 604. Secret key generator 610 can combine secret key shares generated on auxiliary system 604 with secret key shares generated by secret key generator 610 to create secret key 614. Secret key 614 can be encoded in helper data 626 using shares of RBT 630 that are provided by RBT reader 606 to authenticator 602 and auxiliary system 604. The secret key 614 can then be used in an authentication process.

Auxiliary system 604 can be used during enrollment and re-enrollment operations. Auxiliary system 604 includes a secret key generator 612 that can be used to generate a secret key 616. Similar to secret key generator 610, secret key generator 612 can generate secret key shares, provide secret key shares to authenticator 602, and receive secret key shares generated by authenticator 602.

RBT reader 606, authenticator 602 and auxiliary system 604 can be implemented on various types of computing devices. For example, RBT reader 606 may include a biometric sensor at an entrance door of an enterprise, along with accompanying processor or other circuitry to process biometric information and provide RBTs to authenticator 602 and auxiliary system 604. As a further example, RBT reader 606 can be a user's phone.

In one or more aspects, authenticator 602 can be implemented on an enterprise server. In other aspects, authenticator 602 can be implemented as a service, for example, as a web service or cloud service. An authentication application program interface (API) 622 can be used to provide a software defined interface to functionality provided by authenticator 602.

In one or more aspects, auxiliary system 604 can be implemented on a user's phone. In further aspects, auxiliary system 604 can be implemented as a web service or a cloud service. An auxiliary application programming interface (API) 614 can provide a software interface to functionality provided by auxiliary service 604.

It should be noted that the functionality provided by the RBT reader 606, authenticator 602 and auxiliary system 604 can be distributed differently than shown by the example illustrated in FIG. 6. For example, RBT reader 606 and auxiliary system 604 can both be implemented on a user's phone. Further, it should be noted that a BIA system 600 can include more than one RBT reader 606, auxiliary system 604, and authenticator 602.

Further details on example operations performed by RBT reader 606, authenticator 602 and auxiliary system 604 are provided below with reference to FIGS. 9-11.

The RBT reader 606, authenticator 602, and auxiliary system 604 may implement a non-commutative fuzzy vault (ncFV) 618. The ncFV 618 can be used to embed a secret key into the helper data using RBT. Further details on the operation of the ncFV 618 are provided below with reference to FIGS. 7 and 8.

In one or more aspects, additional security and privacy is provided using secure two-party computation (2PC). For example, authenticator 602 and auxiliary system 614 may implement 2PC 620 as part of, or in addition to, ncFV 618. 2PC enables mutually distrusting parties to jointly compute a function $f$ of their private inputs while revealing no information (other than what is revealed by the output of the function) about their inputs to the other parties. In the Honest-But-Curious (HBC) model of 2PC, corrupted parties may collaborate to learn private inputs of other parties, but they do not deviate from the protocol specification for $f$'s computation. In the Malicious model, corrupted parties may collude and can deviate from the protocol specification, and attempt to affect the results of the computation off. In one or more aspects, 2PC 620 implements the Malicious model.

Figure 7:
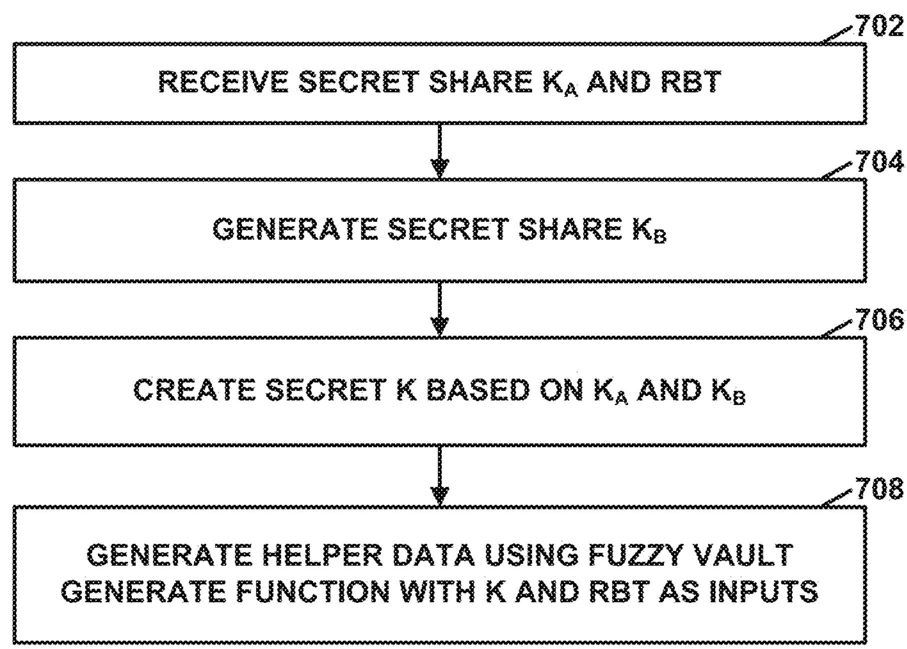
FIG. 7 is a flowchart illustrating an example non-commutative fuzzy vault generate operation, in accordance with one or more aspects described in this disclosure.

FIG. 7 is a flowchart illustrating example non-commutative fuzzy vault generate operations, in accordance with one or more aspects described in this disclosure. To address the input commutativity limitation of conventional FVs, an ncFV can be used to generate helper data. In one or more aspects, the ncFV allows a single authenticator to store a secret key and the corresponding helper data without compromising RBT's privacy. In both a conventional FV and an ncFV, the secret key can be cryptographic material used for authentication. As noted above, knowing the authentication secret key is the same as knowing the coefficients of the polynomial $P_k$ generated using the secret key. The ncFV can add more randomness (in addition to the authentication secret) encoded in $P_k$'s coefficients. In one or more aspects, a generate function of the ncFV receives a secret key $k_A$ and an RBT as inputs (702). The generate function generates a second secret key $k_B$ (704). A secret key k is created such that $k=k_A \| k_B$ (706). In one or more aspects, $k_A$ represents the cryptographic material used for authentication, and $k_B$ can be a random bit-string. Thus, half of $P_k$' s coefficients are derived from $k_A$ and half from $k_B$. The generate function of the ncFV can then generate helper data as output using a conventional FV generate algorithm with k and RBT as inputs (708).

As discussed above, in the FV algorithm the points $L_P$ determined by the polynomial $P_k$ and the chaff points $L_S$ are shuffled together using a random permutation prior to inclusion in the helper data. In one or more aspects, an "oblivious shuffle" is used to shuffle the points. The goal of the oblivious shuffle is to have the parties (e.g., the authenticator and the auxiliary party to randomly permute their shares in the same way, allowing for one-to-one reconstruction of the elements in the list. However, the parties holding the shares themselves must not learn the permutation being computed. Otherwise, by knowing the permutation used to mix biometric points and chaff points, the parties would be able to recover the biometric by unshuffling the list once the HD is reconstructed. In one or more aspects, the FV generator computes an oblivious shuffle of a list of secret shares by computing $O((l_P+l_S)^2)$ pairwise oblivious swaps. A pairwise shuffle can be implemented having three inputs:

(1) a secret share of an element in the list ($L_P \cup L_S$), call it [e1].

(2) a secret share of another element in ($L_P \cup L_S$), call it [e2].

(3) a secret share of a bit randomly generated in 2PC, call it [b].

To obliviously swap the two elements each party computes:

$$[e1]_{new}=(([e1]*[b])+([e2]*[1-b]))$$

$$[e^2]_{new}=(([e2]*[b])+([e1]*[1-b]))$$

Figure 8:
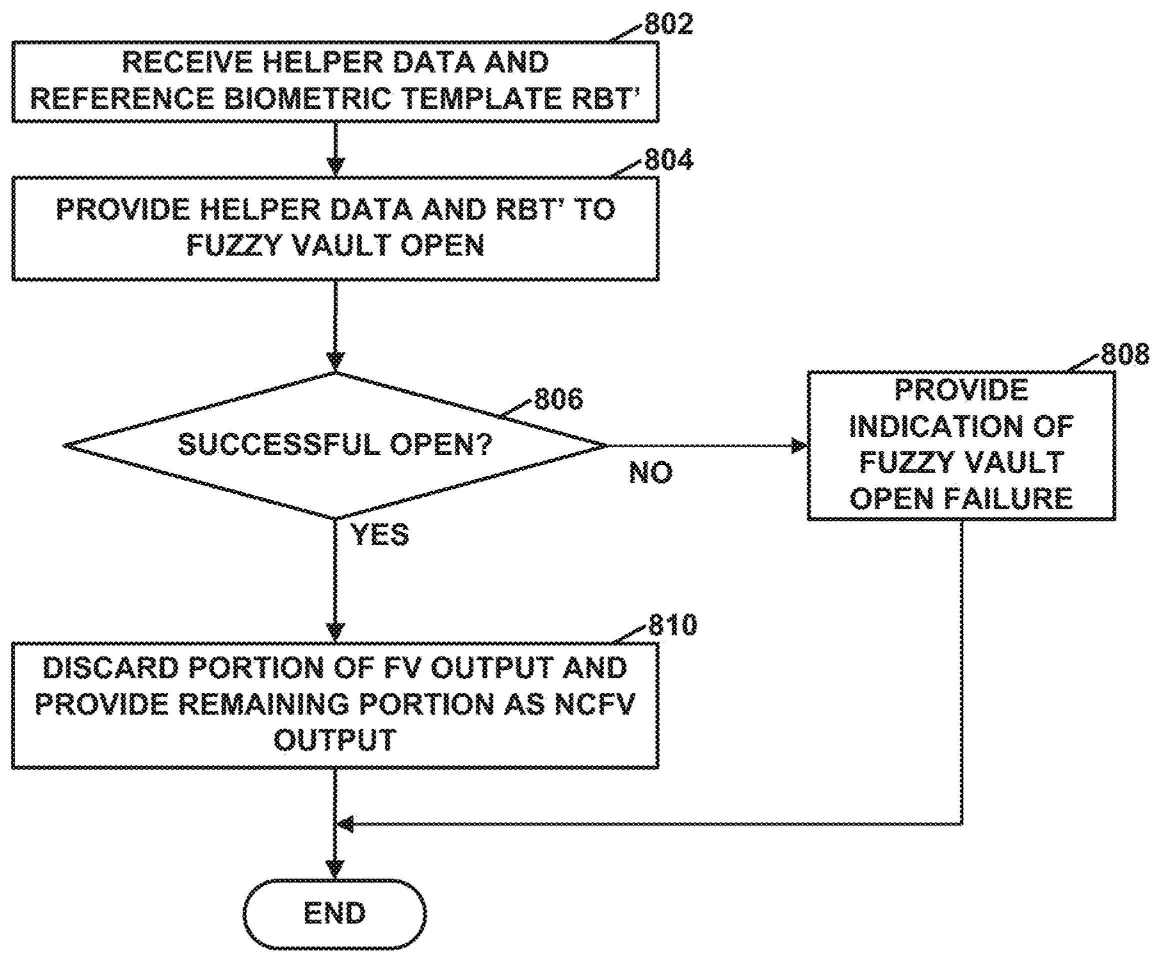
FIG. 8 is a flowchart illustrating an example non-commutative fuzzy vault open operation, in accordance with one or more aspects described in this disclosure.

The shares of b are randomly generated in a maliciously secure 2PC protocol. Therefore, the 2PC protocol guarantees that b is always random/unpredictable even to the parties generating b (as long as they do not collude). For each pair, if bit b is 1 the same position is maintained otherwise the pair gets swapped. Since b is chosen randomly in 2PC, the elements get re-randomized. Therefore, there is no means to figure whether they got swapped or not by looking at the result. Finally, an oblivious shuffle of the entire list ($L_P \cup L_S$) can be computed by iterating through the list repeating random pairwise swaps of successive elements FIG. 8 is a flowchart illustrating example ncFV open operations, in accordance with one or more aspects described in this disclosure. An ncFV open function receives helper data and RBT' as input (802). The helper data and RBT' can be provided to a conventional FV open function (804). If the FV open function cannot successfully determine a key from the input RBT' ("NO" branch of operation 806), then the ncFV open function returns an indication that the open failed (808). This indicates that the RBT' did not sufficiently match the RBT provided during the enrollment process. If the FV open function is able to determine the coefficients of the polynomial used to generate the helper data ("YES" branch of operation 806), then the ncFV open function discards the coefficients associated with $k_B$, and returns the coefficients associated with $k_A$ as output (808). As an example, assume that the FV open function successfully returns $\{a_0, \ldots, a_d, a_{d+1}, \ldots, a_{2d+1}\}$ as coefficients. The coefficients $a_0$-$a_d$ are associated with $k_A$, and the coefficients $a_{d+1}$-$a_{2d+1}$ are associated with $k_B$. Coefficients $a_{d+1}$-$a_{2d+1}$ can be discarded, and the coefficients $a_0$-$a_d$ can be used to create the output key.

A formal definition of the ncFV generate function and the ncFV open function is presented in FIG. 13. The ncFV presented in Algorithm 1 of FIG. 13 and described above with respect to FIG. 7 generates helper data HD that can be opened using the standard $FV_{OPEN}$ algorithm. Opening HD yields k, but only half of k, that is $k_A$, can be considered as valid cryptographic material. This enables storing HD and $k_A$ at the same entity without compromising the $RBT_U$ used to generate the helper data. The $RBT_U$ cannot be computed successfully because, even though $k_A$ is known, the polynomial $P_k$ is not, because $k_A$ now does not uniquely determine it. Definitions 1, 2 and 3 of FIG. 12 are amended with Definition 4 of FIG. 13, which defines the non-commutative property of the ncFV.

Figure 9:
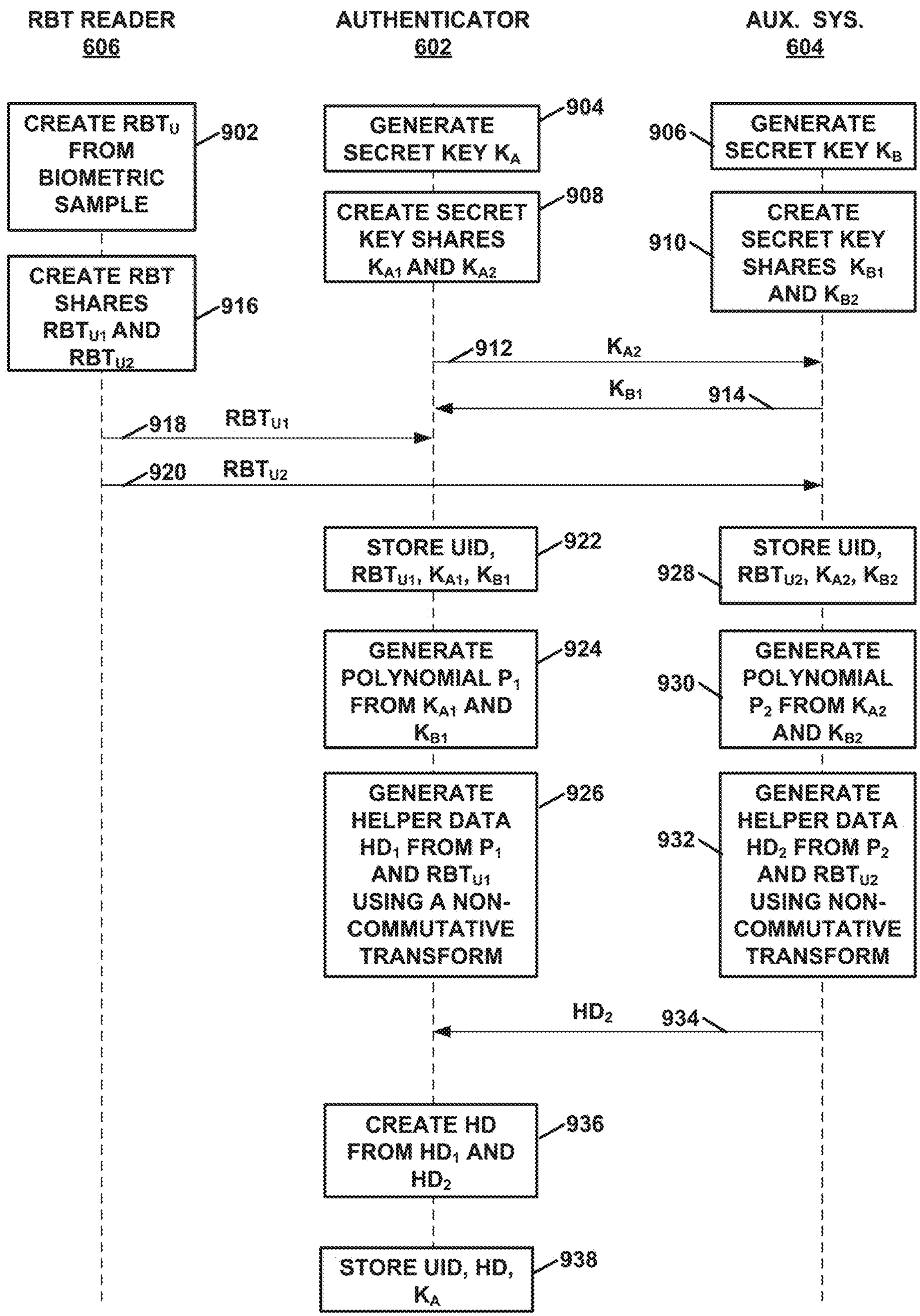
FIG. 9 is a flowchart illustrating example enrollment operations of the example biometric authentication system, in accordance with one or more aspects described in this disclosure.

FIG. 9 is a flowchart illustrating example enrollment operations of the example biometric authentication system, in accordance with one or more aspects described in this disclosure. The operations illustrated in FIG. 9 can be performed when an enrollment process is initiated to enroll a user with a biometric authentication system. In response to a user providing a biometric sample as part of an enrollment process, the RBT reader 606 can create an RBT ($RBT_U$) associated with the user (902). The data comprising $RBT_U$ can include indicia of biometric information from the biometric sample and may vary depending on the type of biometric information obtained. Indicia of biometric information may include minutiae points of a fingerprint, iris codes in the case of eye scans, or other points of granularity of a biometric sample. As an example, an $RBT_U$ for a fingerprint scan may identify the coordinates and orientation of specific points (e.g., ridge endings, ridge bifurcations, short ridges, etc.) of a fingerprint.

Authenticator 602 can generate a secret key ($K_A$) (904). Authenticator 602 can create two shares of $K_A$ (906). A first portion of $K_A$ can be copied to $K_{A1}$ and a second portion of $K_A$ can be copied to $K_{A2}$. Auxiliary system 604 can also generate a secret key ($K_B$) (908) and create two shares of $K_B$ (910). A first portion of $K_B$ can be copied to $K_{B1}$ and a second portion of $K_B$ can be copied to $K_{B2}$. Authenticator 602 and auxiliary system 604 can exchange shares of their respective secret keys. Authenticator 602 can provide $K_{A2}$ to auxiliary system 604 (912), and auxiliary system 604 can provide $K_{B1}$ to authenticator 602 (914).

The RBT reader 606 can create two shares ($RBT_{U1}$ and $RBT_{U2}$) from $RBT_U$ (916). A first portion of $RBT_U$ can be copied to $RBT_{U1}$ and a second portion of $RBT_U$ can be copied to $RBT_{U2}$. RBT reader 606 can provide $RBT_{U1}$ to authenticator 602 (918), and $RBT_{U2}$ to auxiliary system 604 (920).

Authenticator 602 can persistently store its shares $RBT_{U1}$, $K_{A1}$ and $K_{B1}$ in association with a user identification (UID) of the user being enrolled with the biometric authentication system (922).

Authenticator 602 can generate a polynomial $P_1$ of degree 2d+1 defined over a field $GF(2^\tau)$ using $K_{A1}$ and $K_{B1}$ (924). In one or more aspects, $K_{A1}$ and $K_{B1}$ can be combined (i.e., concatenated) into a single key k (i.e., $k=K_{A1}\|K_{B1}$), and k can be encoded or split into the 2d+1 coefficients ($a_i$) of $P_1$. The resulting polynomial can be defined as described above in equation 5, where the coefficients $\{a_0, \ldots, a_{2d+1}\}$ are generated from k and can be used to reconstruct k.

Authenticator 602 can use $P_1$ to generate a first share of helper data $HD_1$ using a non-commutative transform (926). In one or more aspects, operations 924 and 926 can be performed by an ncFV generate function.

Auxiliary system 604 can persistently store its shares $RBT_{U2}$, $K_{A2}$ and $K_{B2}$ in association with a user identification (UID) of the user being enrolled with the biometric authentication system (928).

Auxiliary system 604 can generate a polynomial $P_2$ of degree 2d+1 defined over a field $GF(2^\tau)$ using $K_{A2}$ and $K_{B2}$ (930). In one or more aspects, $K_{A2}$ and $K_{B2}$ can be combined (i.e., concatenated) into a single key k (i.e., $k=K_{A2}\|K_{B2}$), and k can be encoded or split into the 2d+1 coefficients ($a_i$) of $P_2$. The resulting polynomial can be defined as described above in equation 5, where the coefficients $\{a_0, \ldots, a_{2d+1}\}$ are generated from k and can be used to reconstruct k.

Auxiliary system 604 can use $P_2$ to generate a second share of helper data $HD_2$ using a non-commutative transform (932). In one or more aspects, operations 930 and 932 can be performed by an ncFV generate function.

Auxiliary system 604 can provide its second share of the helper data $HD_2$ to authenticator 602 (934).

Authenticator 602 can then create the full version of the helper data HD using the first share $HD_1$ and the second share $HD_2$ (936). Authenticator 602 can store the helper data HD and secret key $K_A$ in association with the user ID (938).

Figure 10:
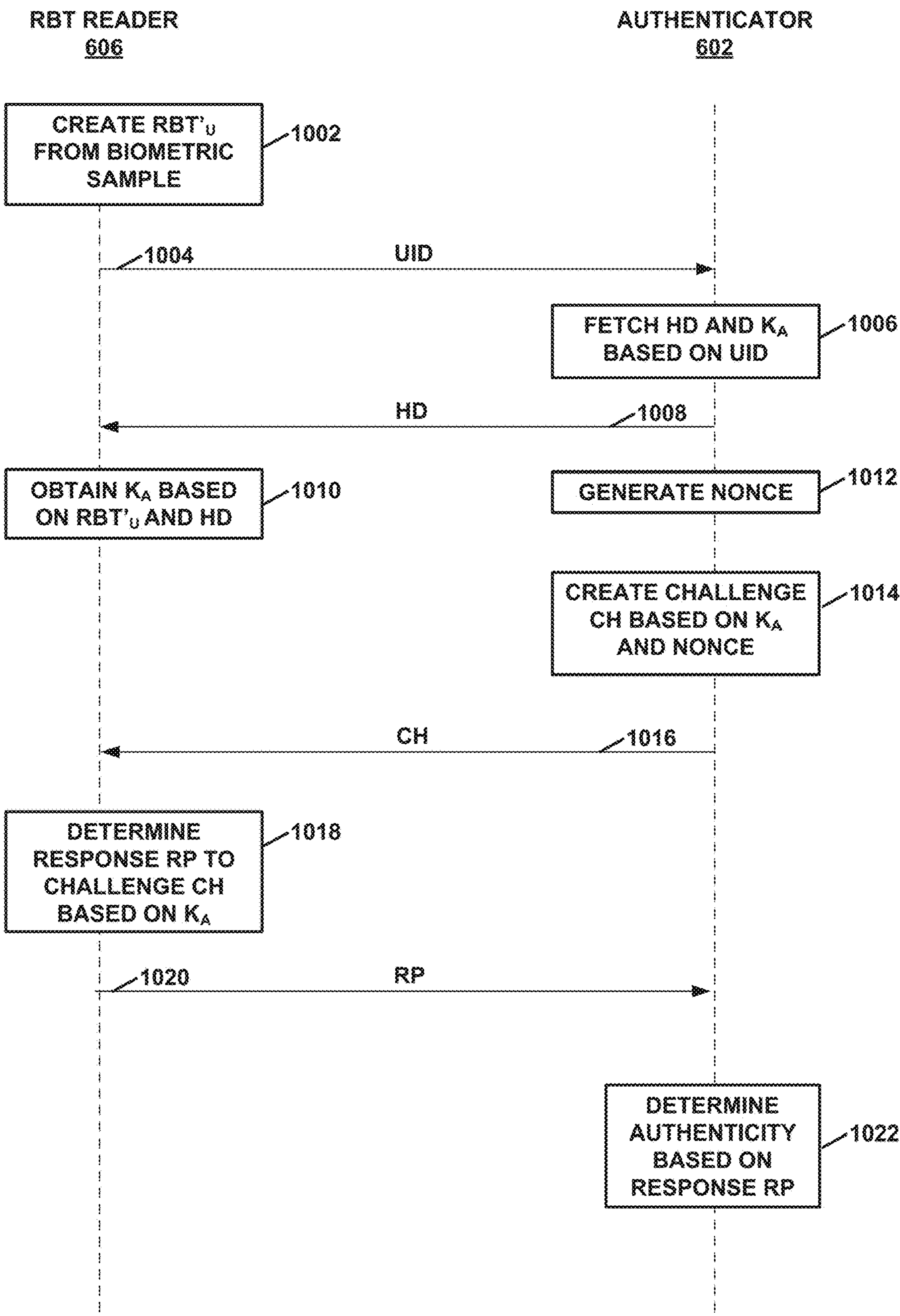
FIG. 10 is a flowchart illustrating example authentication operations of the example biometric authentication system, in accordance with one or more aspects described in this disclosure.

FIG. 10 is a flowchart illustrating example authentication operations of the example biometric authentication system, in accordance with one or more aspects described in this disclosure. In response to a user providing a biometric sample as part of an authentication process, the RBT reader 606 can create an RBT'u associated with the user (1002). The RBT reader 606 creating RBT'u may be the same RBT reader 606 as used to enroll a user, or it may be a different RBT reader 606. As an example, a user may use their phone as an RBT reader 606 to enroll in BIA system 600. After enrollment, the user may use a different RBT reader 606, for example, an RBT reader 606 at a door, to gain entrance to a building. As noted above, the data comprising an RBT can include indicia of biometric information from the biometric sample and may vary depending on the type of biometric information obtained. Indicia of biometric information may include minutiae points of a fingerprint, iris codes in the case of eye scans, or other points of granularity of a biometric sample.

The RBT reader 606 can provide the UID of the user providing the biometric sample to the authenticator 602 (1004). The UID may be obtained in various ways. For example, in one or more aspects, the UID can be obtained from a badge worn or carried by the user. In one or more aspects, the UID may be encoded into a bar code on the badge that is read by the RBT reader 606 or encoded in a radio frequency identification (RFID) device on the badge that is read via an RFID reader on RBT reader 606. In one or more aspects, the UID may be entered via a keyboard or keypad. The authenticator 602 can obtain the helper data HD and secret key $K_A$ that was stored and associated with the UID during the enrollment process described above (1006). The authenticator 602 can provide the HD to the RBT reader 606 (1008).

RBT reader 606 can then attempt to obtain $K_A$ based on the $RBT'_U$ and the helper data HD (1010). For example, the RBT reader 606 can use a ncFV open function to obtain $K_A$.

Authenticator 602 can generate a nonce (1012). In one or more aspects, the nonce can be a number generated by a random number generator. Authenticator 602 can create a challenge CH based on $K_A$ and the nonce (1014). Authenticator 602 can provide the challenge CH to RBT reader 606 (1016).

RBT reader 606 receives the challenge CH and can determine a response RP to the challenge CH (1018). The response RP can be determined based on the $K_A$ the RBT reader 606 determined at operation 1010. The RBT reader can provide the response RP to authenticator 602 (1020).

Authenticator 602 can determine the authenticity of the user based on the response RP received from the RBT reader using challenge/response algorithms.

Figure 11:
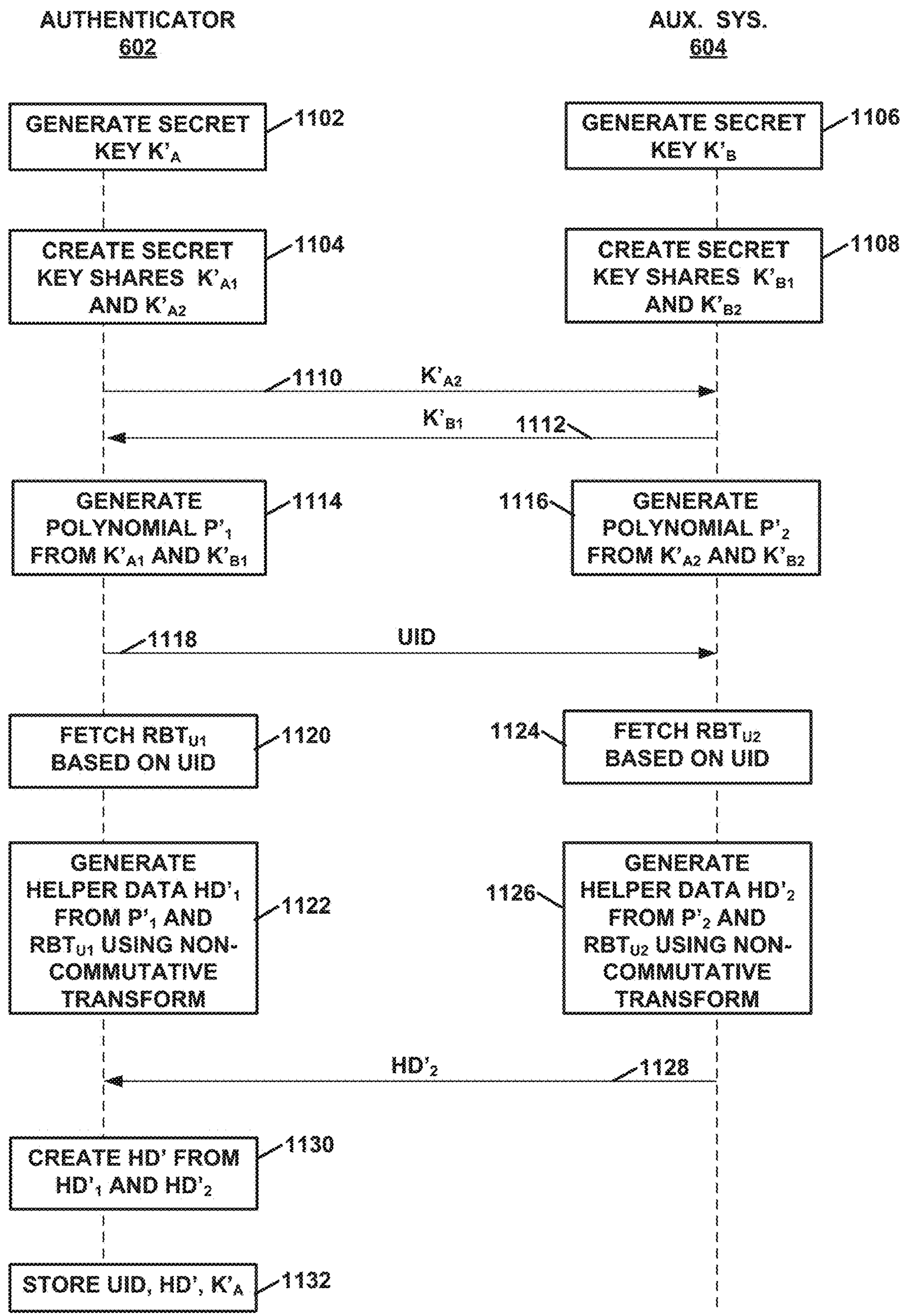
FIG. 11 is a flowchart illustrating example non-interactive re-enrollment operations of the example biometric authentication system, in accordance with one or more aspects described in this disclosure.

FIG. 11 is a flowchart illustrating example non-interactive re-enrollment operations of the example biometric authentication system, in accordance with one or more aspects described in this disclosure. The operations illustrated in FIG. 11 can be performed when a re-enrollment process is initiated. As an example, a re-enrollment process may be initiated in response to detecting a security breach of the BIA.

Authenticator 602 can generate a secret key ($K'_A$) (1102). Authenticator 602 can create two shares of $K'_A$ (1104). A first portion of $K'_A$ can be copied to $K'_{A1}$ and a second portion of $K'_A$ can be copied to $K'_{A2}$. Auxiliary system 604 can also generate a secret key ($K'_B$) (1106) and create two shares of $K'_B$ (1108). A first portion of $K'_B$ can be copied to $K'_{B1}$ and a second portion of $K'_B$ can be copied to $K'_{B2}$. Authenticator 602 and auxiliary system 604 can exchange shares of their respective secret keys. Authenticator 602 can provide $K'_{A2}$ to auxiliary system 604 (1110), and auxiliary system 604 can provide $K'_{B1}$ to authenticator 602 (1112).

Authenticator 602 can generate a polynomial $P'_1$ of degree 2d+1 defined over a field $GF(2^\tau)$ using $K'_{A1}$ and $K'_{B1}$ (1114). In one or more aspects, $K'_{A1}$ and $K'_{B1}$ can be combined (i.e., concatenated) into a single key k (i.e., $k=K'_{A1}\|K'_{B1}$), and k can be encoded or split into the 2d+1 coefficients ($a_i$) of $P'_1$.

Auxiliary system 604 can generate a polynomial $P'_2$ of degree 2d+1 defined over a field $GF(2^\tau)$ using $K'_{A2}$ and $K'_{B2}$ (1116). In one or more aspects, $K'_{A2}$ and $K'_{B2}$ can be combined (i.e., concatenated) into a single key k (i.e., $k=K'_{A2}\|K'_{B2}$), and k can be encoded or split into the 2d+1 coefficients (a) of $P'_2$.

Authenticator 602 can provide the UID being re-enrolled to auxiliary system 604 (1118). Authenticator 602 can fetch the previously stored $RBT_{U1}$ based on the UID being re-enrolled (1120).

Authenticator 602 can use $P'_1$ to generate a first share of helper data $HD'_1$ using a non-commutative transform (1122). In one or more aspects, operations 1114 and 1122 can be performed by an ncFV generate function.

Auxiliary system 604 can fetch the previously stored $RBT_{U2}$ based on the UID being re-enrolled (1124). Auxiliary system 604 can use $P'_2$ to generate a second share of helper data $HD'_2$ using a non-commutative transform (1126). In one or more aspects, operations 1116 and 1126 can be performed by an ncFV generate function.

Auxiliary system 604 can provide its second share of the helper data HD'2 to authenticator 602 (1128).

Authenticator 602 can then create a new version of the helper data HD' using the first share $HD'_1$ and the second share $HD'_2$ (1130). Authenticator 602 can store the new helper data HD' and new secret key $K_A$ in association with the UID (1132).

The above-described systems and methods can provide advantages over conventional BIA systems, and can improve the functioning of BIA computing systems. For example, the enrollment process can be improved in one or more aspects because the $RBT_U$ does not appear/exist in clear in the authenticator or in the auxiliary system, they each only see one share of $RBT_U$. The full $RBT_U$ may only exist ephemerally in the RBT reader, which is unavoidable, as the RBT Reader is the sensor used to sample the user's biometric. Additionally, in one or more aspects, the secret used for authentication $K_A$ is only known to the authenticator. Therefore, not even a compromised auxiliary system can assist an adversary into authenticating to an authenticator on behalf of the user. This is because the auxiliary system only sees a share of $K_A$. Therefore, the only way to retrieve $K_A$ (other than compromising authenticator itself) is by successfully opening the associated HD. Moreover, users are not required to reveal their biometrics to any entity authenticating them, nor any backends or online services. This ensures that compromise of any element of the BIA system does not lead to leakage of sensitive biometric information of a large number of users. Such leakage of sensitive biometric information of millions of individuals has already occurred several times (in different countries) when backends of current BIA systems used by governments and in the private-sector have been breached in past years.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in one or more aspects, the functionality described herein may be provided within dedicated hardware and/or software modules configured for encoding and decoding, or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units.

Various examples have been described. These and other examples are within the scope of the following claims.

What is claimed is:

1. A method comprising:

receiving, by an authenticator of a biometric authentication system, a first share of a reference biometric template (RBT) from a biometric sensor;

creating, by the authenticator, a first secret key comprising a first share of the first secret key and a second share of the first secret key;

transmitting, by the authenticator, the second share of the first secret key to an auxiliary system;

receiving, by the authenticator, a first share of a second secret key from the auxiliary system;

determining, by the authenticator, a first polynomial from the first share of the first secret key and the first share of the second secret key;

generating, by the authenticator, a first share of first helper data based, at least in part, on the first polynomial and the first share of the reference biometric template;

receiving, by the authenticator from the auxiliary system, a second share of the first helper data;

creating, by the authenticator, the first helper data from the first share of the first helper data and the second share of the first helper data; and storing, by the authenticator, the first secret key and the first helper data in a storage device for use in authenticating a user associated with the reference biometric template;

wherein the reference biometric template cannot be recovered using clear forms of the first secret key and the first helper data.

2. The method of claim 1, wherein the generating, by the authenticator, the first share of the first helper data comprises generating the first share of the first helper data utilizing a non-commutative transformation function.

3. The method of claim 2, wherein the non-commutative transformation function comprises a non-commutative generate function of a fuzzy vault.

4. The method of claim 1, further comprising:

receiving, by the auxiliary system, a second share of the reference biometric template from the biometric sensor;

creating, by the auxiliary system, a second secret key comprising the first share of the second secret key and a second share of the second secret key;

providing, by the auxiliary system, the first share of the second secret key to the authenticator;

receiving, by the auxiliary system, the second share of the first secret key;

determining, by the auxiliary system, a second polynomial from the second share of the first secret key and the second share of the second secret key;

generating, by the auxiliary system, the second share of the first helper data based, at least in part, on the second polynomial and the second share of the reference biometric template; and providing, by the auxiliary system, the second share of the first helper data to the authenticator.

5. The method of claim 4, wherein the generating, by the auxiliary system, the second share of the first helper data comprises generating the second share of the first helper data utilizing a non-commutative transformation function.

6. The method of claim 5, wherein the non-commutative transformation function comprises a non-commutative generate function of a fuzzy vault.

7. The method of claim 1, further comprising:

creating, by an RBT reader, a second reference biometric template from a biometric sample;

providing a user identification (UID) to the authenticator;

receiving, by the RBT reader, the first helper data associated with the UID from the authenticator;

determining, by the RBT reader, the first secret key based, at least in part, on the second reference biometric template and the first helper data; and determining, by the authenticator, that the RBT reader has correctly determined the first secret key.

8. The method of claim 7, wherein the determining, by the authenticator, that the RBT reader has correctly determined the first secret key comprises determining that the RBT reader has provided a correct response to challenge data determined according to the first secret key.

9. The method of claim 1, further comprising:

receiving a UID to be re-enrolled;

creating, by the authenticator, a third secret key comprising a first share of the third secret key and a second share of the third secret key;

creating, by the auxiliary system, a fourth secret key comprising a first share of the fourth secret key and a second share of the fourth secret key;

receiving, by the authenticator, the first share of the fourth secret key from the auxiliary system;

determining, by the authenticator, a third polynomial from the first share of the third secret key and the first share of the fourth secret key;

obtaining, by the authenticator, the first share of the reference biometric template based on the UID;

generating, by the authenticator, a first share of second helper data based, at least in part, on the third polynomial and the first share of the reference biometric template;

receiving, by the auxiliary system, the second share of the third secret key from the authenticator;

determining, by the auxiliary system, a fourth polynomial from the second share of the third secret key and the second share of the fourth secret key;

obtaining, by the auxiliary system, the second share of the reference biometric template based on the UID;

generating, by the auxiliary system, a second share of the second helper data based, at least in part, on the fourth polynomial and the second share of the reference biometric template;

providing, by the auxiliary system, the second share of the second helper data to the authenticator;

creating, by the authenticator, the second helper data from the first share of the second helper data and the second share of the second helper data to re-enroll the user; and storing, by the authenticator, the third secret key and the second helper data in the storage device.

10. The method of claim 1, wherein generating the first share of first helper data comprises:

generating, by a fuzzy vault generate function of the authenticator, the first share of first helper data based, at least in part, on the first polynomial and the first share of the reference biometric template.

11. The method of claim 10, wherein determining the first polynomial comprises generating coefficients for the first polynomial based on the first share of the first secret key and the first share of the second secret key, and wherein generating, by the fuzzy vault generate function of the authenticator, the first share of first helper data comprises:

evaluating, by the authenticator, the first polynomial for data points in the first share of the reference biometric template to create a first list of points;

creating, by the authenticator, a second list of randomly generated points;

merging, by the authenticator, the first list of points and the second list of randomly generated points to create a merged list;

obliviously shuffling, by the authenticator, the merged list; and incorporating, by the computing system, the shuffled merged list into the first helper data.

12. The method of claim 11, wherein evaluating, by the authenticator, the first polynomial comprises evaluating the first polynomial using a secure two-party computation.

13. The method of claim 11, wherein obliviously shuffling, by the authenticator, the merged list comprises determining to swap two entries in the merged list based on a value provided by a secure two-party computation.

14. The method of claim 7, wherein determining that the RBT reader has correctly determined the first secret key comprises:

determining, by a fuzzy vault open function of the authenticator, a set of output coefficients based, at least in part, on the first helper data and the second reference biometric template;

determining, by the fuzzy vault open function of the authenticator, an output secret key based, at least in part, on a first strict subset of the set of output coefficients; and determining that the output secret key matches the first secret key.

15. The method of claim 14, wherein the first strict subset comprises coefficients corresponding to the first secret key share, and wherein a second strict subset of the set of output coefficients corresponding to the second secret key share are not used to determine the output secret key.

16. A biometric authentication system comprising:

an auxiliary system comprising processing circuitry configured to:

receive a first share of a reference biometric template from a biometric sensor;

create a first secret key comprising a first share of the first secret key and a second share of the first secret key;

receive a first share of a second secret key from an authenticator;

transmit the first share of the first secret key to the authenticator;

determine a first polynomial from the first share of the first secret key and the first share of the second secret key; and generate a first share of first helper data based, at least in part, on the first polynomial and the first share of the reference biometric template, and transmit the first share of the first helper data to the authenticator;

wherein the first helper data is for use in authenticating a user associated with the reference biometric template.

17. The system of claim 16, wherein the authenticator is configured to:

receive a second share of the reference biometric template from the biometric sensor;

create a second secret key comprising the first share of the second secret key and a second share of the second secret key;

receive, from the auxiliary system, the second share of the second secret key;

determine a second polynomial from the second share of the first secret key and the second share of the second secret key;

generate a second share of the first helper data based, at least in part, on the second polynomial and the second share of the reference biometric template;

receive, from the auxiliary system, the first share of the first helper data;

create the first helper data from the first share of the first helper data and the second share of the first helper data; and store the second secret key and the first helper data in a storage device;

wherein the reference biometric template cannot be recovered using clear forms of the second secret key and the first helper data.

18. The system of claim 16, further comprising an RBT reader incorporating the biometric sensor, the RBT reader configured to:

create a second reference biometric template from a biometric sample obtained via the biometric sensor;

receive the first helper data from the authenticator; and determine the second secret key based, at least in part, on the second reference biometric template and the first helper data;

wherein the authenticator is further configured to determine that the RBT reader has correctly determined the second secret key.

19. The system of claim 16, wherein the reference biometric template is determined according to biometric information of a user, and wherein the auxiliary system comprises a service provided on a device controlled by the user.

20. The system of claim 16, wherein the authenticator comprises a service provided on a cloud-based system.

21. A biometric authentication system comprising:

a first reference biometric template (RBT) reader comprising a first biometric sensor, the first RBT reader comprising processing circuitry configured to:

create an authentication reference biometric template from a first biometric sample obtained via the first biometric sensor;

provide a user identification to an authenticator;

receive helper data from the authenticator, the helper data comprising a first share determined by the authenticator based on the user identification and a second share determined by an auxiliary system; and determine a secret key based, at least in part, on the authentication reference biometric template and the helper data, wherein the secret key is determined according to a strict subset of coefficients of a polynomial encoded into the helper data;

wherein the authenticator is further configured to determine that the first RBT reader has correctly determined the secret key.

22. The biometric authentication system of claim 21, further comprising:

a second RBT reader comprising a second biometric sensor, the second RBT reader comprising processing circuitry configured to:

create an enrollment reference biometric template from a second biometric sample obtained via the second biometric sensor;

create a first share of the enrollment reference biometric template and a second share of the enrollment reference biometric template;

provide the first share of the enrollment reference biometric template to the authenticator; and provide the second share of the enrollment reference biometric template to the auxiliary system.

* * * * *